US012573334B2

(12) United States Patent
Zhang

(10) Patent No.: US 12,573,334 B2
(45) Date of Patent: Mar. 10, 2026

(54) DISPLAY PANEL AND DISPLAY APPARATUS WITH IMPROVED UNIFORMITY

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Mengmeng Zhang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/822,924

(22) Filed: Sep. 3, 2024

(65) Prior Publication Data

US 2024/0428724 A1 Dec. 26, 2024

(30) Foreign Application Priority Data

Apr. 11, 2024 (CN) ........................ 202410437311.8

(51) Int. Cl.
*G09G 3/32* (2016.01)
*G09G 3/3233* (2016.01)
*G09G 3/3266* (2016.01)

(52) U.S. Cl.
CPC ............ *G09G 3/32* (2013.01); *G09G 3/3233* (2013.01); *G09G 3/3266* (2013.01); *G09G 2300/0426* (2013.01); *G09G 2310/0286* (2013.01); *G09G 2310/061* (2013.01); *G09G 2320/0233* (2013.01); *G09G 2320/0247* (2013.01); *G09G 2330/023* (2013.01)

(58) Field of Classification Search
CPC ...... G09G 3/32; G09G 3/3233; G09G 3/3266; G09G 2300/0426; G09G 2310/0286; G09G 2310/061; G09G 2320/0233; G09G 2320/0247; G09G 2330/023
See application file for complete search history.

(56) References Cited

U.S. PATENT DOCUMENTS

2016/0321990 A1* 11/2016 Kim .................... G09G 3/3233
2022/0343851 A1* 10/2022 Kuang ................ G09G 3/3233

FOREIGN PATENT DOCUMENTS

CN 110649080 A 1/2020
CN 112530369 A 3/2021
CN 117746789 A * 3/2024 .......... G09G 3/3266

* cited by examiner

*Primary Examiner* — Adam J Snyder
(74) *Attorney, Agent, or Firm* — Christensen O'Connor Johnson Kindness PLLC

(57) ABSTRACT

A display panel and a display apparatus are provided. Display panel includes data lines, pixel circuits, and adjustment circuits; adjustment circuits each are electrically connected to one of data lines; adjustment circuit includes a first capacitor; in response to a data writing stage of a first pixel circuit, m pixel circuits are in an adjustment stage; in response to data writing stage of a second pixel circuit, n pixel circuits are in adjustment stage; and first capacitor in at least one of adjustment circuits is electrically connected to a target data line in response to data writing stage of second pixel circuit. In the present disclosure, by taking first capacitor in adjustment circuit as a device for balancing loads of target data line in different work periods, a substantial difference between loads connected to target data line in different periods can be avoided.

16 Claims, 26 Drawing Sheets

DISPLAY PANEL AND DISPLAY APPARATUS WITH IMPROVED UNIFORMITY

CROSS-REFERENCE TO RELATED APPLICATIONS

The present disclosure claims priority to Chinese Patent Application No. 202410437311.8, filed on Apr. 11, 2024, the content of which is incorporated herein by reference in its entirety.

TECHNICAL FIELD

The present disclosure relates to the field of display technologies, and in particular to a display panel and a display apparatus.

BACKGROUND

In existing display technologies, for the sake of a better display effect of a display panel, when the display panel displays a frame of picture, a driving transistor in a pixel circuit is adjusted correspondingly to ensure a driving effect. Meanwhile, in order that a work cycle of the pixel circuit is not prolonged by adjustment of the driving transistor to affect a refresh rate of the display panel, an adjustment stage of the driving transistor is executed at the same time with a work stage of other portions of the pixel circuit. However, this causes non-uniform display of the display panel. Specifically, initial few rows of pixels or last few rows of pixels in the display panel are excessively bright or dark.

SUMMARY

In view of this, embodiments of the present disclosure provide a display panel and a display apparatus, to solve the above problem.

According to a first aspect, an embodiment of the present disclosure provides a display panel, including: a plurality of data lines, a plurality of pixel circuits, and a plurality of adjustment circuits. The pixel circuits each include a driving transistor and a data writing module; the data writing module includes a first end electrically connected to one of the data lines, and a second end electrically connected to the driving transistor; a work cycle of the pixel circuit includes a data writing stage and at least one adjustment stage; the data writing module in the pixel circuit is turned on in the data writing stage and writes a data voltage on the data line into the driving transistor; and the data writing module in the pixel circuit is turned on in the adjustment stage and writes an adjustment voltage on the data line into the driving transistor. At least one of the adjustment circuits is electrically connected to a same data line, and the adjustment circuit includes a first capacitor.

In a plurality of pixel circuits electrically connected to a target data line, in response to the data writing stage of a first pixel circuit, m pixel circuits are in the adjustment stage. In response to the data writing stage of a second pixel circuit, n pixel circuits are in the adjustment stage, m>n. The target data line is one of the plurality of data lines. Both the first pixel circuit and the second pixel circuit are the pixel circuit electrically connected to the target data line.

The first capacitor in at least one of the adjustment circuits is electrically connected to the target data line in response to the data writing stage of the second pixel circuit.

According to a second aspect, based on a same inventive conception, an embodiment of the present disclosure provides a display apparatus, including a display panel, the display panel include a plurality of data lines, a plurality of pixel circuits, and a plurality of adjustment circuits. The pixel circuits each include a driving transistor and a data writing module; the data writing module includes a first end electrically connected to one of the data lines, and a second end electrically connected to the driving transistor; a work cycle of the pixel circuit includes a data writing stage and at least one adjustment stage; the data writing module in the pixel circuit is turned on in the data writing stage and writes a data voltage on the data line into the driving transistor; and the data writing module in the pixel circuit is turned on in the adjustment stage and writes an adjustment voltage on the data line into the driving transistor. At least one of the adjustment circuits is electrically connected to a same data line, and the adjustment circuit includes a first capacitor. In a plurality of pixel circuits electrically connected to a target data line, in response to the data writing stage of a first pixel circuit, m pixel circuits are in the adjustment stage. In response to the data writing stage of a second pixel circuit, n pixel circuits are in the adjustment stage, m>n. The target data line is one of the plurality of data lines. Both the first pixel circuit and the second pixel circuit are the pixel circuit electrically connected to the target data line. The first capacitor in at least one of the adjustment circuits is electrically connected to the target data line in response to the data writing stage of the second pixel circuit.

BRIEF DESCRIPTION OF DRAWINGS

To describe the technical solutions of the embodiments of the present disclosure more clearly, the following briefly describes the accompanying drawings required in the embodiments. Apparently, the accompanying drawings in the following description show merely some embodiments of the present disclosure, and those of ordinary skill in the art can still derive other drawings from these accompanying drawings.

DESCRIPTION OF EMBODIMENTS

For a better understanding of the technical solutions of the present disclosure, the following describes in detail the embodiments of the present disclosure with reference to the accompanying drawings.

It should be noted that the described embodiments are merely some, but not all, embodiments of the present disclosure. Based on the embodiments of the present disclosure, all other embodiments obtained by those of ordinary skill in the art fall within the protection scope of the present disclosure.

Terms in the embodiments of the present disclosure are merely used to describe the specific embodiments, and are not intended to limit the present disclosure. Unless otherwise specified in the context, words, such as "a", "the", and "this", in a singular form in the embodiments and appended claims of the present disclosure include plural forms.

It should be understood that the term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

In the description of this specification, it should be understood that the terms such as "substantially", "approximate to", "approximately", "about", "roughly", and "in general" described in the claims and embodiments of the present disclosure mean general agreement within a reasonable process operation range or tolerance range, rather than an exact value.

It should be understood that although the terms such as first and second may be used to describe terminals, scanning sub-lines and pixel circuits in the embodiments of the present disclosure, these terminals, scanning sub-lines and pixel circuits should not be limited to these terms. These terms are used only to distinguish the terminals, the scanning sub-lines and the pixel circuits from each other. For example, without departing from the scope of the embodiments of the present disclosure, a first end may also be referred to as a second end, and similarly, the second end may also be referred to as the first end.

It is obvious for those skilled in the art that various modifications and changes may be made to the present disclosure without departing from the spirit or scope of the present disclosure. Therefore, the present disclosure is intended to cover the modifications and changes on the present disclosure that fall within the range of the corresponding claims (technical solutions claimed) and equivalents thereof. It should be noted that, the implementations provided in the embodiments of the present disclosure can be combined with each other if no conflict occurs.

Through careful and in-depth research, a solution is provided to solve the problem in related arts.

Figure 1:
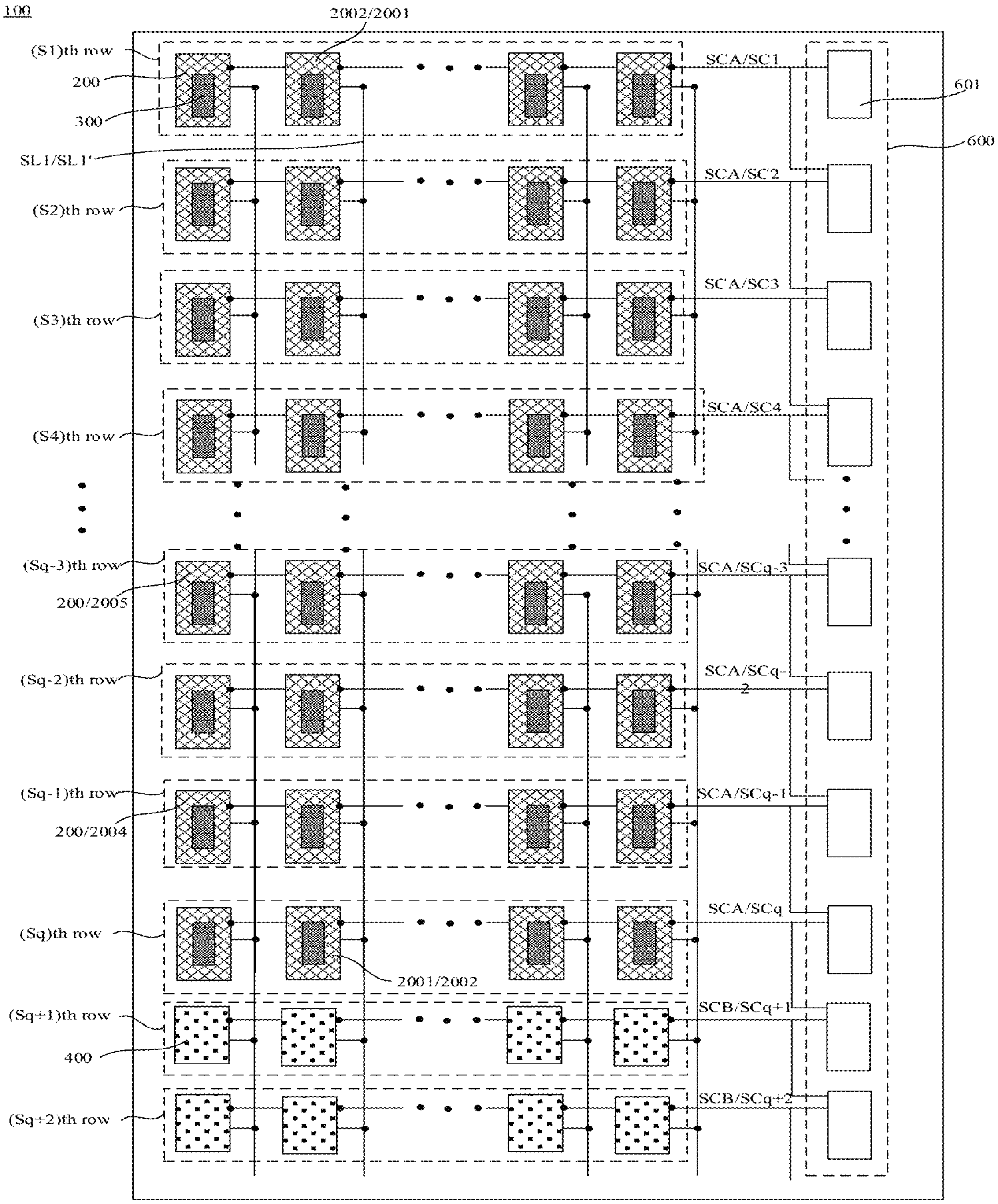
FIG. 1 is a schematic view of a display panel according to an embodiment of the present disclosure.
Figure 2:
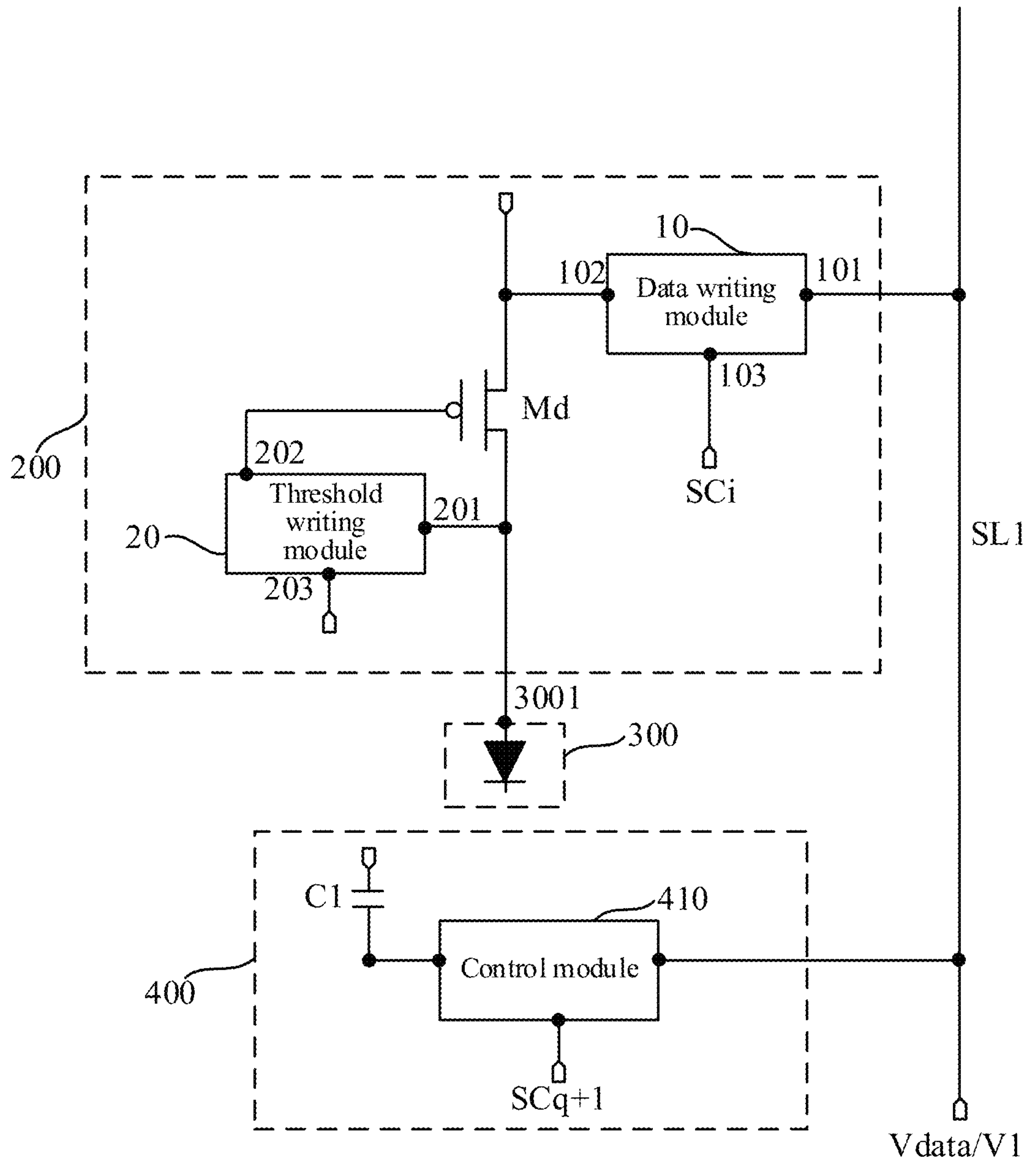
FIG. 2 is an equivalent circuit diagram of a pixel circuit according to an embodiment of the present disclosure.
Figure 3:
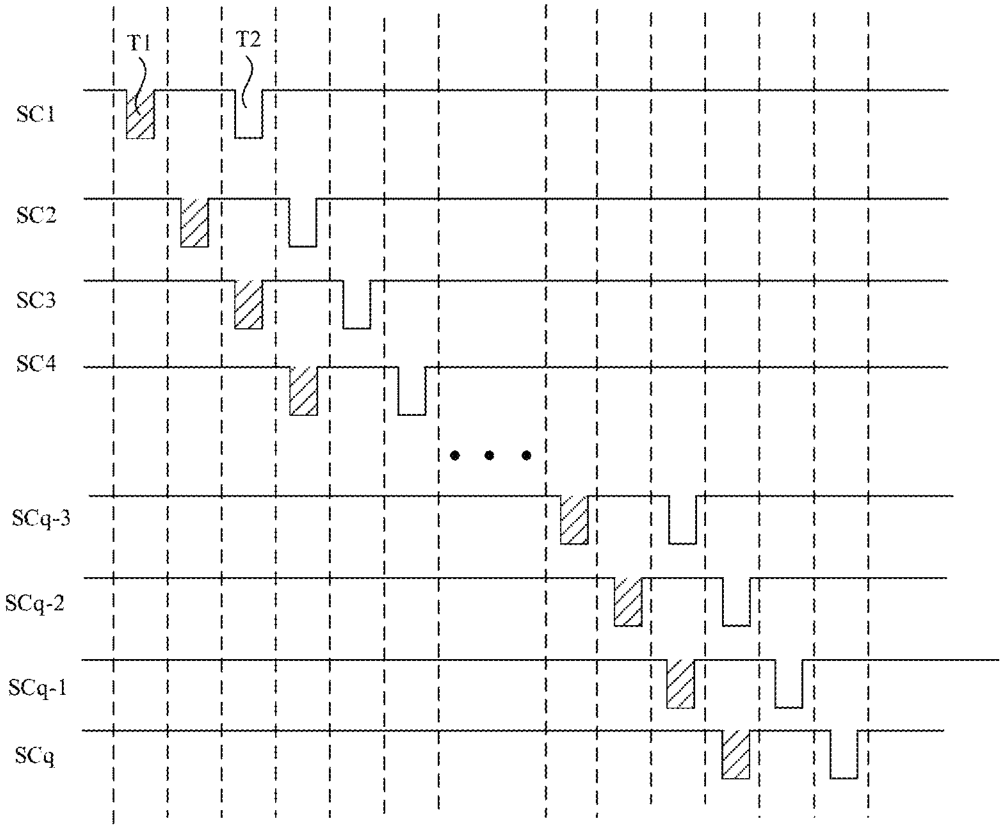
FIG. 3 illustrates a time sequence of a display panel according to an embodiment of the present disclosure.
Figure 4:
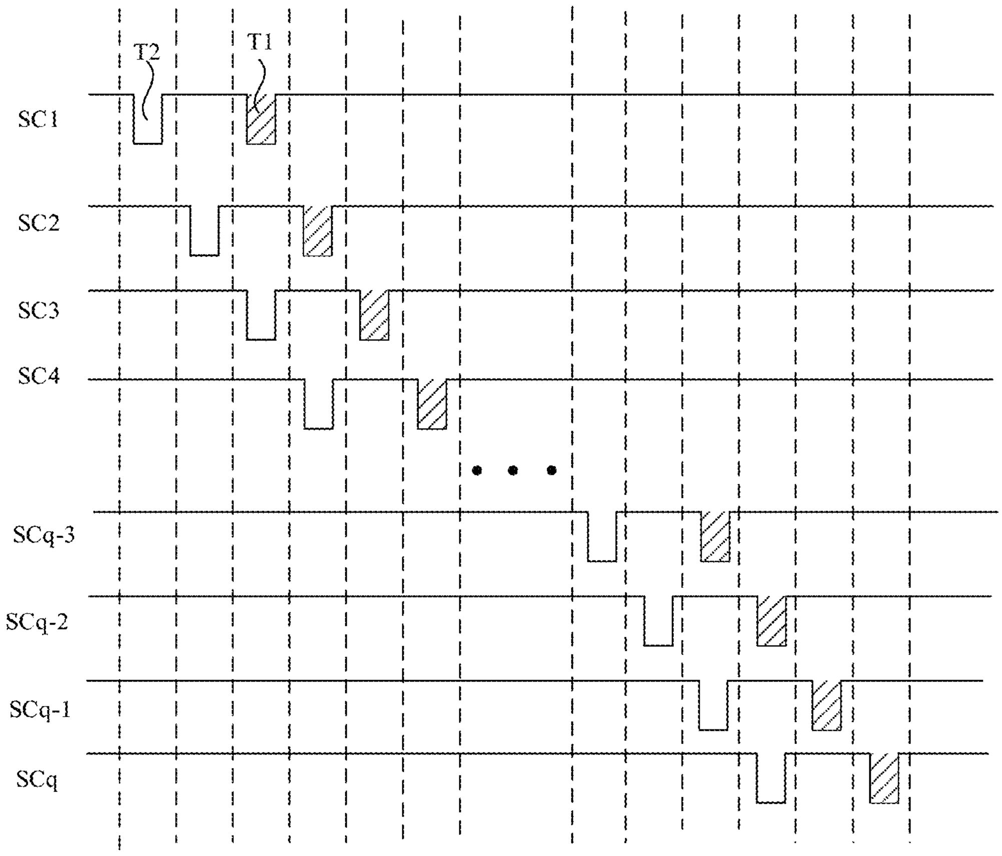
FIG. 4 illustrates another time sequence of a display panel according to an embodiment of the present disclosure.

FIG. 1 is a schematic view of a display panel according to an embodiment of the present disclosure. FIG. 2 is an equivalent circuit diagram of a pixel circuit according to an embodiment of the present disclosure. FIG. 3 illustrates a time sequence of a display panel according to an embodiment of the present disclosure. FIG. 4 illustrates another time sequence of a display panel according to an embodiment of the present disclosure.

As shown in FIG. 1, an embodiment of the present disclosure provides a display panel 100, including a plurality of pixel circuits 200. An output terminal of the pixel circuit 200 is electrically connected to a light-emitting device 300 in the display panel 100 and drives the light-emitting device 300 to emit light. For example, the pixel circuit 200 may drive an organic light-emitting diode (OLED), a micro-LED, and a mini-LED to emit light.

In addition, referring to FIG. 2, the display panel 100 further includes a plurality of data lines SL1. The data lines SL1 each are electrically connected to the pixel circuit 200 and configured to write a data voltage Vdata into the pixel circuit 200. Different data voltages written into the pixel circuit 200 will cause different luminance of the light-emitting device 300 driven by the pixel circuit 200.

The pixel circuit 200 may include a driving transistor Md and a data writing module 10. The data writing module 10 includes a first end 101 electrically connected to the data line SL1, and a second end 102 electrically connected to the driving transistor Md. When the data writing module 10 is turned on, a voltage transmitted on the data line SL1 is written into the pixel circuit 200 through the turned-on data writing module 10.

A work cycle of the pixel circuit 200 includes a data writing stage T1 and at least one adjustment stage T2. The data writing module 10 in the pixel circuit 200 is turned on in both the data writing stage T1 and the adjustment stage T2, so as to transmit a voltage transmitted on the data line SL1 to a specific node of the pixel circuit 200.

The data line SL1 may transmit the data voltage Vdata in the data writing stage T1. The data writing module 10 may be turned on in the data writing stage T1 and write the data voltage Vdata on the data line SL1 into the driving transistor Md. The pixel circuit 200 generates different light-emitting driving currents for different data voltages Vdata, thus causing different luminance of the light-emitting device 300.

For example, as shown in FIG. 2, the pixel circuit 200 further includes a threshold writing module 20. A second end of the data writing module 10 is electrically connected to a first electrode of the driving transistor Md. The threshold writing module 20 includes a first end 201 electrically connected to a second electrode of the driving transistor Md, and a second end 202 electrically connected to a gate of the driving transistor Md. In the data writing stage T1, both the data writing module 10 and the threshold writing module 20 may be turned on. A data voltage Vdata transmitted on the data line SL1 may be written into the gate of the driving transistor Md through the data writing module 10 and the threshold writing module 20.

The data line SL1 transmits an adjustment voltage V1 in the adjustment stage T2. The data writing module 10 of the pixel circuit 200 is turned on in the adjustment stage T2 and writes the adjustment voltage V1 transmitted on the data line SL1 into a specific node of the pixel circuit 200. The specific node of the pixel circuit 200 receives the adjustment voltage V1 in the adjustment stage T2, so as to ensure that the pixel circuit 200 generates a light-emitting driving current.

The time sequence shown by FIG. 3 and FIG. 4 is specifically a time sequence of a scanning line Sci electrically connected to a control terminal 103 of the data writing module 10 in the pixel circuit 200. The scanning line Sci is electrically connected to the control terminal 103 of the data writing module 10 in the pixel circuits 200 on an (Si)th row, i being an integer less than or equal to q, and greater than or equal to 1. For example, a low level transmitted by the scanning line Sci is taken as an effective signal (namely the data writing module 10 is controlled in response to the low level transmitted by the scanning line Sci).

For example, referring to FIG. 3, in order to improve a flicker problem when the display panel 100 emits light, a multi-pulse driving manner may be used to control the display panel 100 to emit the light. That is, when the display panel 100 displays a frame of picture, there are a plurality of light-emitting stages. Further, in order to improve a bias problem of the driving transistor Md, a bias stage may be increased after the data writing stage T1 in the work cycle of the pixel circuit 200. The bias stage is to adjust a bias state of the driving transistor Md. The bias stage may be taken as the adjustment stage T2. A bias voltage for correcting the bias state of the driving transistor Md may be the adjustment voltage V1. In at least one adjustment stage T2, the adjustment voltage V1 is written into the pixel circuit 200 through the turned-on data writing module 10, so as to correct the bias state of the driving transistor Md. It is to be noted that when the second end of the data writing module 10 is electrically connected to the first electrode of the driving transistor Md, and the threshold writing module 20 includes the first end 201 electrically connected to the second electrode of the driving transistor Md, and the second end 202 electrically connected to the gate of the driving transistor Md, the data writing module 10 is turned on in the bias stage, the threshold writing module 20 is turned off in the bias stage, and the bias voltage is written into the first electrode of the driving transistor Md through the turned-on data writing module 10.

For example, referring to FIG. 4, in order to achieve expected luminance of the display panel 100 and reduce power consumption of the display panel 100, a pre-charging manner may be used. That is, a data voltage is pre-written into the pixel circuit 10 in the display panel 100 before the data writing stage T1. In this case, the work cycle of the pixel circuit 10 includes a pre-writing stage. The pre-writing stage may be taken as the adjustment stage T2, and the pre-written voltage pre-written into the driving transistor Md may be the adjustment voltage V1. In at least one adjustment stage T2, the adjustment voltage V1 is written into the pixel circuit 200 through the turned-on data writing module 10, so as to write the pre-written voltage into the driving transistor Md. It is to be noted that when the second end of the data writing module 10 is electrically connected to the first electrode of the driving transistor Md, and the threshold writing module 20 includes the first end 201 electrically connected to the second electrode of the driving transistor Md, and the second end 202 electrically connected to the gate of the driving transistor Md, the data writing module 10 is turned on in the pre-writing stage, the threshold writing module 20 is turned on in the pre-writing stage, and the pre-written voltage is written into the gate of the driving transistor Md through the turned-on data writing module 10 and the turned-on threshold writing module 20.

As shown in FIG. 1, the display panel 100 includes pixel circuits 200 from an (S1)th row to an (Sq)th row. A plurality of pixel circuits 200 in a same column are electrically connected to a same data line SL1. In order not to prolong the work cycle of the pixel circuit 200 for the increased adjustment stage T2 to lower a refresh rate in display of the display panel 100, in the pixel circuits 200 electrically connected to the same data line SL1, the adjustment stage T2 of one pixel circuit 200 may coincide with the data writing stage T1 of at least one of the remaining pixel circuits 200. For example, the adjustment stage T2 of one pixel circuit 200 may completely coincide with the data writing stage T1 of at least one of the remaining pixel circuits 200. In the pixel circuits 200 electrically connected to the same data line SL1, for two pixel circuits 200 with the adjustment stage T2 coinciding with the data writing stage T1, the adjustment voltage V1 received by the pixel circuit 200 in the adjustment stage T2 is the data voltage Vdata received by the pixel circuit 200 in the data writing stage T1 in fact. That is, the data voltage received by the pixel circuit 200 in the data writing stage T1 may be taken as the adjustment voltage V1 received by the pixel circuit 200 in the adjustment stage T2.

For example, referring to FIG. 1 and FIG. 3, when the bias stage (adjustment stage T2) is after the data writing stage T1, for a plurality of pixel circuits 200 nearest to a left frame of the display panel 100 and connected to a same data line SL1, the data writing stage T1 of a fourth pixel circuit 2004 on a (Sq−1)th row coincides with the bias stage (adjustment stage T2) of a fifth pixel circuit 2005 on a (Sq−3)th row. In a same period, an electrical signal transmitted by the same data line SL1 to the fourth pixel circuit 2004 on the (Sq−1)th row is used as the data voltage Vdata, and an electrical signal transmitted to the fifth pixel circuit 2005 on the (Sq−3)th row is used as the adjustment voltage V1.

For example, referring to FIG. 1 and FIG. 4, when the pre-writing stage (adjustment stage T2) is before the data writing stage T1 in the display panel 100, for the plurality of pixel circuits 200 nearest to the left frame of the display panel 100 and connected to the same data line SL1, the data writing stage T1 of the fifth pixel circuit 2005 on the (Sq−3)th row coincides with the pre-writing stage (adjustment stage T2) of the fourth pixel circuit 2004 on the (Sq−1)th row. In a same period, an electrical signal transmitted by the same data line SL1 to the fifth pixel circuit 2005 on the (Sq−3)th row is used as the data voltage Vdata, and an electrical signal transmitted to the fourth pixel circuit 2004 on the (Sq−1)th row is used as the adjustment voltage V1.

In a plurality of pixel circuits 200 electrically connected to a target data line SL1', in response to the data writing stage T1 of a first pixel circuit 2001, m pixel circuits 200 are in the adjustment stage T2. In response to the data writing stage T1 of a second pixel circuit 2002, n pixel circuits are in the adjustment stage T2, m>n. The target data line SL1' is one of the plurality of data lines SL1. Both the first pixel circuit 2001 and the second pixel circuit 2002 are the pixel circuit 200 electrically connected to the target data line SL1'.

Referring also to FIG. 1 and FIG. 3, when the bias stage (adjustment stage T2) is after the data writing stage T1, if the pixel circuit 200 on the (Sq)th row in the display panel 100 is the first pixel circuit 2001, in response to the data writing stage T1 of the first pixel circuit 2001, another m pixel circuits 200 are in the bias stage (adjustment stage T2), m=1. If the pixel circuit 200 on the (S1)th row connected to the target data line SL1' with the first pixel circuit 2001 at the same time in the display panel 100 is the second pixel circuit 2002, another n pixel circuits 200 are in the bias stage (adjustment stage T2), n=0.

Referring also to FIG. 1 and FIG. 4, when the pre-writing stage (adjustment stage T2) is before the data writing stage T1, if the pixel circuit 200 on the (S1)th row in the display panel 100 is the first pixel circuit 2001, in response to the data writing stage T1 of the first pixel circuit 2001, another m pixel circuits 200 are in the pre-writing stage (adjustment stage T2), m=1. If the pixel circuit 200 on the (Sq−1)th row connected to the target data line SL1' with the first pixel circuit 2001 at the same time in the display panel 100 is the second pixel circuit 2002, another n pixel circuits 200 are in the pre-writing stage (adjustment stage T2), n=0.

To sum up, when the bias stage (adjustment stage T2) takes place after the data writing stage T1, in response to the data writing stage T1 of the pixel circuit 200 on initial few rows in the display panel 100, a number of pixel circuits in the adjustment stage T2 is less than a number of pixel circuits 200 on last few rows in the display panel 100 in a same period. When the pre-writing stage (adjustment stage T2) takes place before the data writing stage T1, in response to the data writing stage T1 of the pixel circuit 200 on initial few rows in the display panel 100, a number of pixel circuits in the adjustment stage T2 is greater than a number of pixel circuits 200 on last few rows in the display panel 100 in a same period. A load connected to the target data line SL1' in the data writing stage T1 of the first pixel circuit 2001 is different from a load in the data writing stage T1 of the second pixel circuit 2002.

As can be found from the above analysis, the same data line SL1 may have different loads when writing voltages into the pixel circuit 100 in different periods. Consequently, data voltages received by the gates of the driving transistors Md in some pixel circuits 200 are different for the different loads of the data line, thereby affecting the luminance of the light-emitting device 300. Specifically, the display region close to an upper frame and/or a lower frame in the display panel 100 is excessively bright or dark.

In order to solve the above problem, a plurality of adjustment circuits 400 are provided in the display panel 100. At least one of the adjustment circuits 400 is electrically connected to a same data line SL1. The adjustment circuit 400 is configured to balance loads of the data line SL1 in different work periods, such that when the data line SL1 transmits an electrical signal to different numbers of pixel circuits 200, loads connected to the data line SL1 are approximately the same, thereby preventing different data voltages Vdata respectively received by the pixel circuit 200 in some data writing stages T1.

The adjustment circuit 400 includes a first capacitor C1. The first capacitor C1 may serve as a load of the adjustment circuit 400. The first capacitor C1 in at least one adjustment circuit 400 is electrically connected to the target data line SL1' in response to the data writing stage T1 of the second pixel circuit 2002.

When the target data line SL1' transmits a data voltage Vdata to the second pixel circuit 2002 in the data writing stage T1, the target data line SL1' is electrically connected to the first capacitor C1 of at least one adjustment circuit 400, and the first capacitor C1 increases the load of the target data line SL1'. The load of the target data line SL1' in the data writing stage T1 of the first pixel circuit 2001 is basically the same as the load of the target data line SL1' in the data writing stage T1 of the second pixel circuit 2002. When the target data line SL1' has the basically same load in different work periods, the display region of the display panel 100 can achieve more uniform luminance.

In the embodiment of the present disclosure, the capacitor can keep a stable potential of a node electrically connected to the capacitor. By taking the first capacitor C1 in the adjustment circuit 400 as a device for balancing loads of the target data line SL1' in different work periods, a big difference between the loads connected to the target data line SL1' in the different periods can be prevented.

Figure 5:
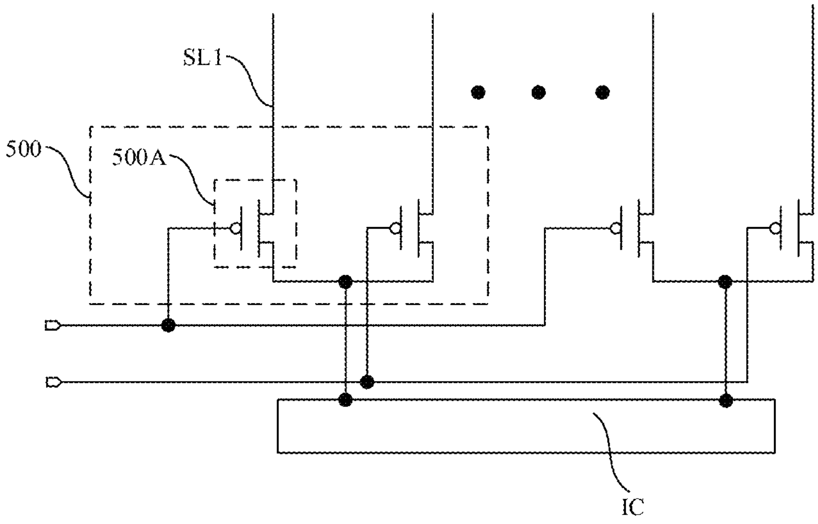
FIG. 5 is a schematic view of a multiplexer circuit according to an embodiment of the present disclosure.

FIG. 5 is a schematic view of a multiplexer circuit according to an embodiment of the present disclosure.

In an embodiment of the present disclosure, as shown in FIG. 5, the display panel 100 further includes a multiplexer circuit 500. The multiplexer circuit 500 is configured to transmit a voltage signal to different data lines SL1. The multiplexer circuit 500 includes a plurality of selector switches 500A. In the multiplexer circuit 500, the plurality of selector switches 500A include input terminals electrically connected, and output terminals respectively electrically connected to different data lines SL1. The plurality (two or more) of selector switches 500A are turned on in a time-sharing manner. When the plurality of selector switches 500A in the multiplexer circuit 500 are turned on in the time-sharing manner, the data lines SL1 respectively electrically connected to the output terminals of the plurality of selector switches 500A receive a data voltage provided by an integrated circuit (IC). When the multiplexer circuit 500 is electrically connected to the data line SL1, line charging is used to write the data voltage Vdata into the pixel circuit 200. That is, the IC writes the data voltage Vdata into the data line SL1 through the selector switches 500A turned on in the time-sharing manner in the multiplexer circuit 500, and the data line SL1 keeps the data voltage Vdata and writes the data voltage Vdata into the corresponding pixel circuit 200 in the data writing stage T1.

Correspondingly, in a plurality of pixel circuits 200 electrically connected to a same data line SL1, a period in which at least one pixel circuit 200 receives the adjustment voltage V1 in the adjustment stage T2 coincides with a period in which another pixel circuit 200 receives the data voltage Vdata in the data writing stage T1, and the adjustment voltage V1 and the data voltage Vdata are voltage signals written into the data line SL1 at the same time with a same writing manner. That is, the manner for writing the adjustment voltage V1 into the pixel circuit 200 is also the line charging.

When the data line SL1 in the display panel 100 is electrically connected to the multiplexer circuit 500, namely the manner for writing the data voltage Vdata into the pixel circuit 200 is the line charging, the pixel circuit 200 as the load shares the data voltage Vdata on the data line SL1. In response to different numbers of pixel circuits 200 loaded by the same data line SL1 in different work periods, data voltages Vdata received by the pixel circuit 200 in the data writing stage T1 in different work periods are obviously different. The luminance of the display region close to the upper frame and/or the lower frame of the display panel 100 is obviously different from the luminance of other positions. Therefore, according to the technical solutions in the embodiment of the present disclosure, in addition to the pixel circuits 200, a certain number of adjustment circuits 400 are also connected to the same data line SL1. When a load connected to the data line SL1 in some work period is obviously less than a load connected to the data line SL1 in other work periods, at least one adjustment circuit 400 connected to the data line SL1 is adjusted as a load to the data line SL1, such that the data line SL1 has an approximately same load in different work periods. This can effectively improve non-uniform display of the display panel 100 using the line charging.

Figure 6:
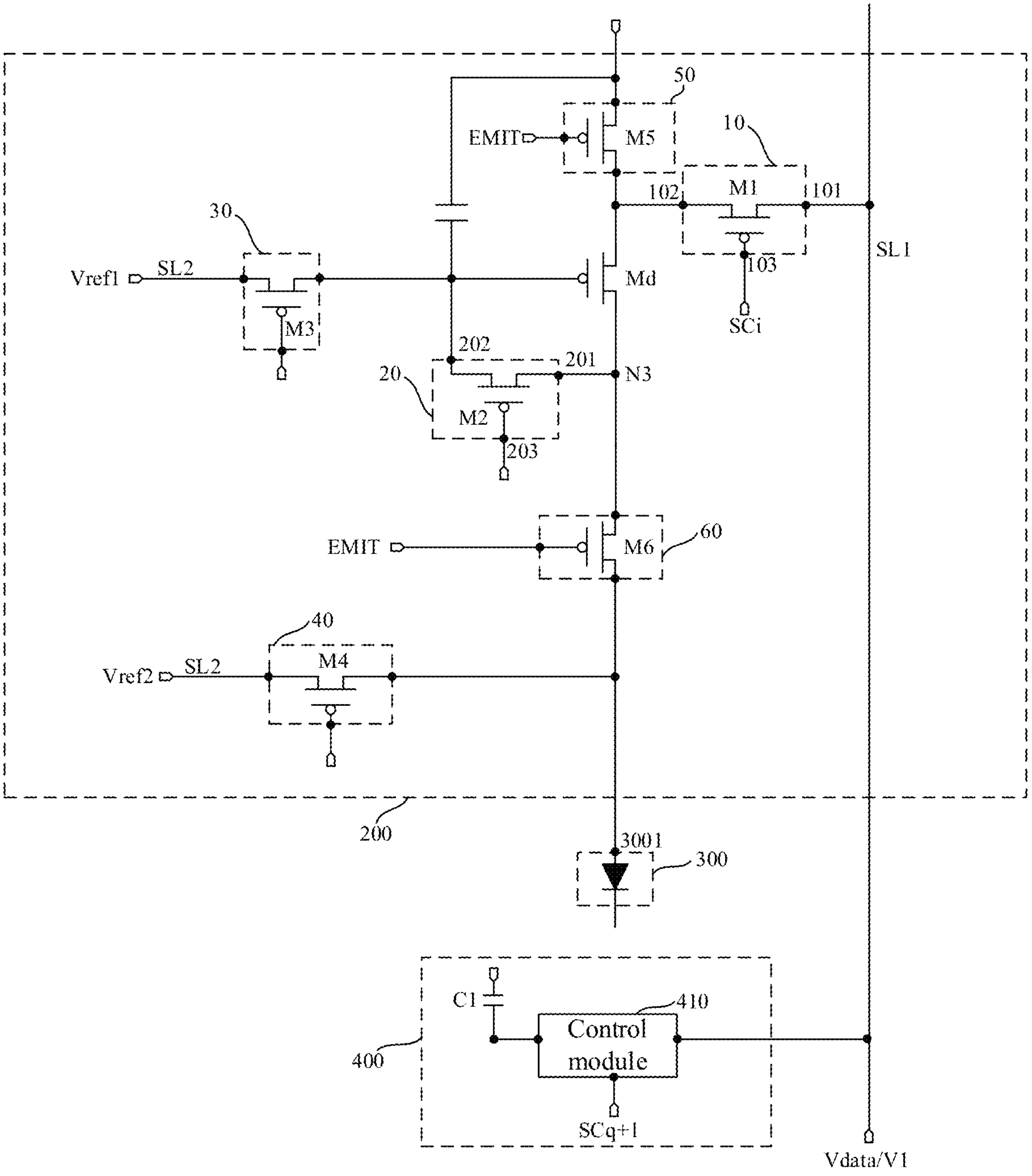
FIG. 6 is a schematic view of the pixel circuit shown in FIG. 2.

FIG. 6 is a schematic view of the pixel circuit shown in FIG. 2.

In an embodiment of the present disclosure, referring to FIG. 2 and FIG. 6, the pixel circuit 200 further includes a threshold writing module 20. A second electrode of the data writing module 10 is electrically connected to a first electrode of the driving transistor Md. The threshold writing module 20 includes a first end 201 electrically connected to a second electrode of the driving transistor Md, and a second end 202 electrically connected to a gate of the driving transistor Md. The threshold writing module 20 may be configured to compensate a threshold voltage of the driving transistor Md.

The data writing module 10 may include a first transistor M1. The first transistor M1 includes a first electrode receiving the data voltage Vdata, a second electrode electrically connected to the first electrode of the driving transistor Md, and a gate electrically connected to the scanning line Sci (i in the scanning line Sci represents an integer, and indicates an ith scanning line. For example, a first scanning line is called SC1 or a qth scanning line is called SCq). The threshold writing module 20 may include a second transistor M2. The second transistor M2 includes a first electrode electrically connected to the second electrode of the driving transistor Md, a second electrode electrically connected to the gate of the driving transistor Md, and a gate electrically connected to the scanning line.

In the work cycle T of the pixel circuit 200, at least one adjustment stage T2 is before the data writing stage T1. The threshold writing module 20 is turned on in both the data writing stage T1 and the adjustment stage T2 before the data writing stage T1. In this case, the threshold writing module 20 and the data writing module 10 may receive a same control signal. While the data writing module 10 is turned on to receive a data voltage Vdata or an adjustment voltage V1 after receiving the control signal, the threshold writing module 20 is also turned on to write the data voltage Vdata or the adjustment voltage V1 into the gate of the driving transistor Md.

When at least one adjustment stage T2 is after the data writing stage T1, the threshold writing module 20 is turned off in the adjustment stage T2 after the data writing stage. In this case, the threshold writing module 20 is turned off, so as to prevent an adjustment voltage V1 received by the driving transistor Md from changing a potential on the gate of the driving transistor.

The pixel circuit 200 further includes a power voltage writing module 50 and a light-emitting control module 60. The power voltage writing module 50 is configured to transmit a power voltage to the driving transistor Md, such that the driving transistor Md generates a light-emitting driving current. The power voltage writing module 50 includes a fifth transistor M5. The fifth transistor M5 includes a first electrode receiving the power voltage, a second electrode electrically connected to the first electrode of the driving transistor Md, and a gate electrically connected to a light-emitting control signal EMIT. The light-emitting control module 60 is configured to transmit the light-emitting driving current to a first electrode 3001 of the light-emitting device 300, thereby driving the light-emitting device 300 to emit light. The light-emitting control module 60 includes a sixth transistor M6. The sixth transistor M6 includes a first electrode receiving the light-emitting driving current, a second electrode electrically connected to the first electrode 3001 of the light-emitting device 300, and a gate electrically connected to the light-emitting control signal EMIT.

Figure 7:
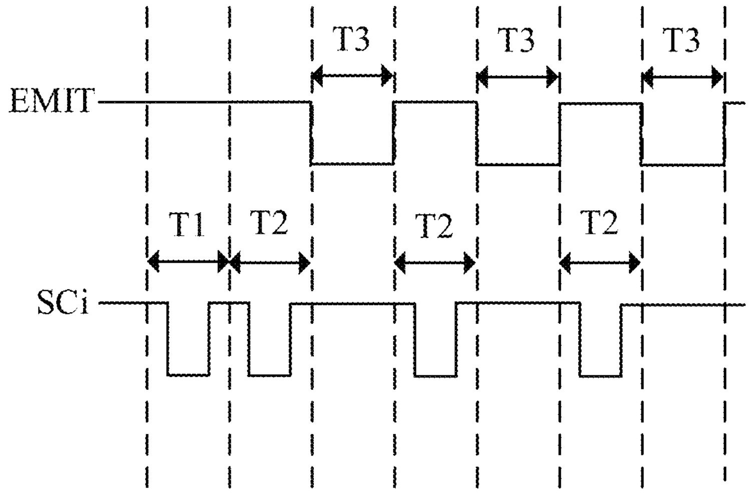
FIG. 7 illustrates a time sequence of a pixel circuit according to an embodiment of the present disclosure.

FIG. 7 illustrates a time sequence of a pixel circuit according to an embodiment of the present disclosure.

In an embodiment of the present disclosure, as shown in FIG. 7, in the work cycle of the pixel circuit 200, at least one adjustment stage T2 is after the data writing stage T1.

As shown in FIG. 7, the work cycle T of the pixel circuit 200 further includes a plurality of light-emitting stages T3. At least one adjustment stage T2 after the data writing stage T1 is between adjacent ones of the light-emitting stages T3. In addition, the adjustment stage T2 may also be included between the light-emitting stage T3 and the data writing stage T1.

When the display panel 100 displays a frame of picture, the plurality of light-emitting stages T3 are conducive to reducing power consumption of the display panel 100. With one light-emitting stage T3 after the data writing stage T1, the bias state of the driving transistor Md changes to some extent before the next light-emitting stage T3. Hence, the data writing module 10 of the pixel circuit 200 is turned on again to correct the bias state of the driving transistor Md in the adjustment stage T2.

In this process, due to the adjustment stage T2, the data line SL1 connected to a plurality of pixel circuits 200 may have non-uniform access loads in different periods. Therefore, the adjustment circuit 400 including the first capacitor C1 is provided in the display panel 100 in the present disclosure to balance the load on the data line SL1. While better reducing the power consumption of the display panel 100, this ensures more uniform luminance of the display panel 100.

In an embodiment of the present disclosure, an output terminal of the pixel circuit 200 is electrically connected to the light-emitting device 300. The adjustment circuit 400 is electrically insulated from the light-emitting device 300. That is, the light-emitting device 300 is electrically connected to the pixel circuit 200, and is driven by the pixel circuit 200 to emit light. The light-emitting device 300 is not driven by the adjustment circuit 400 to emit the light. Optionally, the adjustment circuit 400 and the light-emitting device 300 have different circuit structures. Optionally, if at least one light-emitting device 300 is driven by the adjustment circuit 400 to emit light, and at least one light-emitting device 300 is driven by the pixel circuit 200 to emit light, different luminance will occur to cause non-uniform light emission. In the present disclosure, the adjustment circuit 400 is electrically insulated from the light-emitting device 300. This does not increase the power consumption, and can effectively prevent the non-uniform light emission caused by the above reason.

Figure 8:
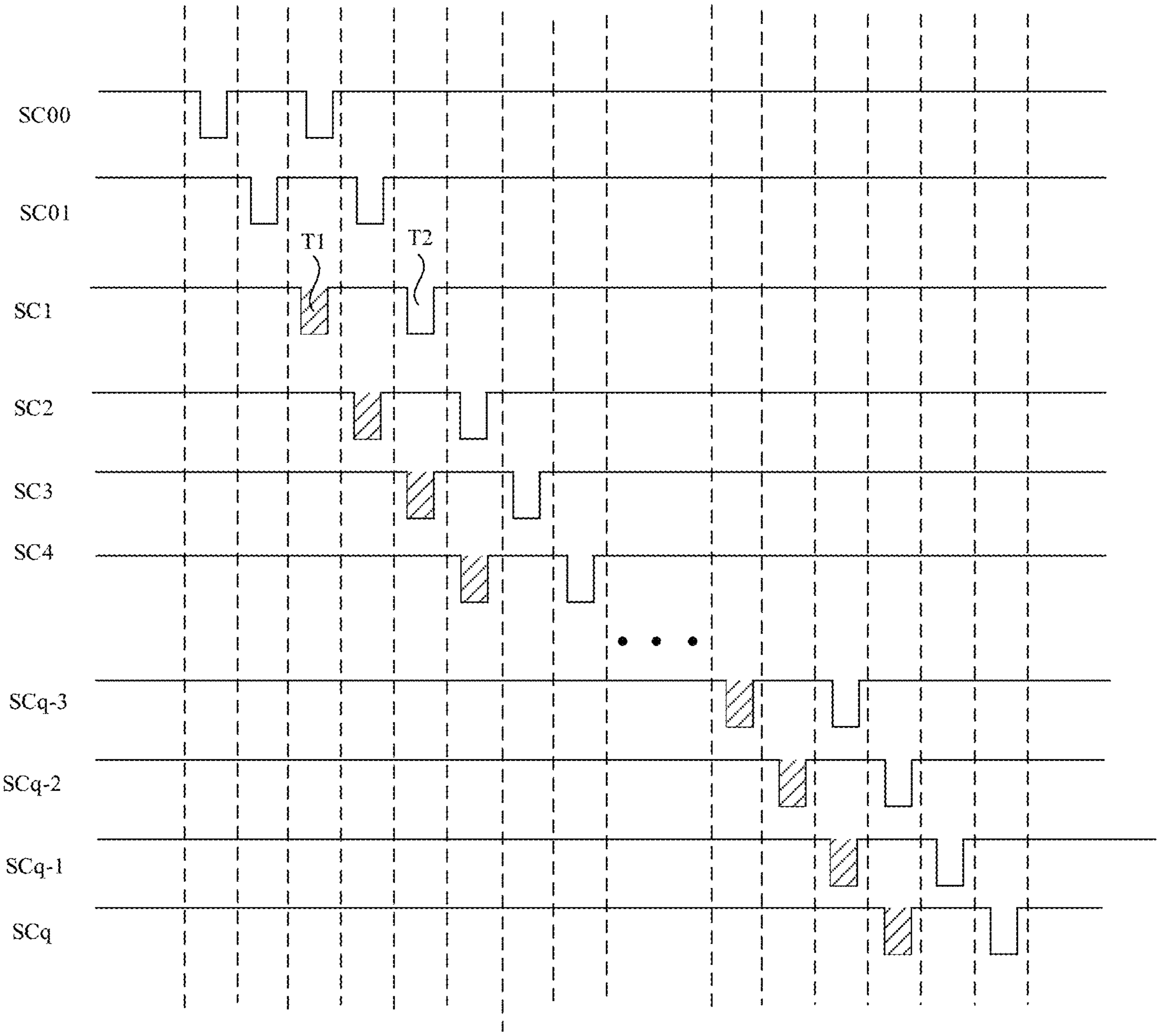
FIG. 8 illustrates a driving time sequence of a display panel according to an embodiment of the present disclosure.
Figure 9:
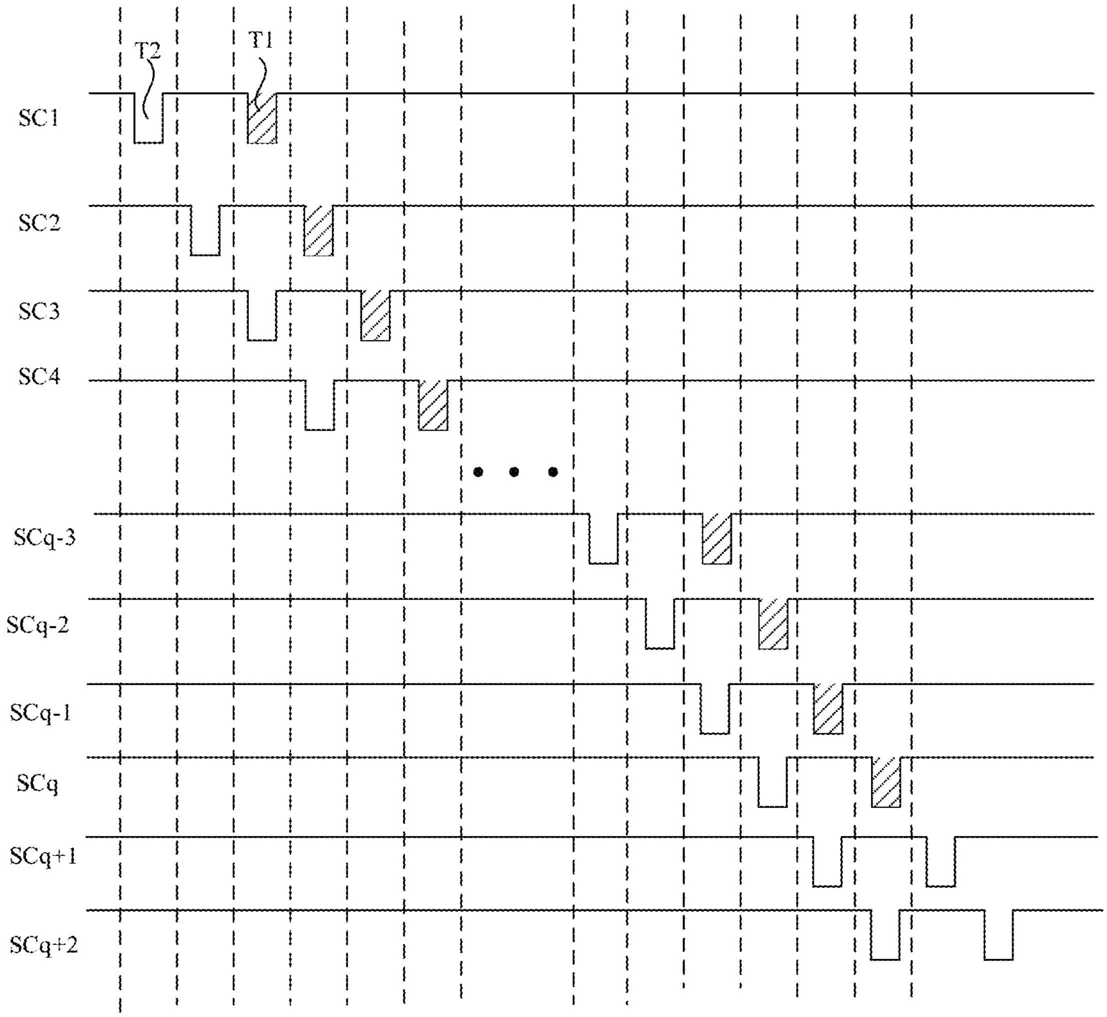
FIG. 9 illustrates another driving time sequence of a display panel according to an embodiment of the present disclosure.

FIG. 8 illustrates a driving time sequence of a display panel according to an embodiment of the present disclosure. FIG. 9 illustrates another driving time sequence of a display panel according to an embodiment of the present disclosure.

In an embodiment of the present disclosure, as shown in FIG. 2, the adjustment circuit 400 further includes a control module 410. The control module 410 includes a first end electrically connected to the data line SL1, and a second end electrically connected to a first electrode plate of the first capacitor C1. The control module 410 is configured to electrically connect the first capacitor C1 to the data line SL1 when turned on, and electrically disconnect the first capacitor C1 from the data line SL1 when turned off.

As shown in FIG. 2, the data writing module 10 in the pixel circuit 200 is controlled by a signal transmitted by the scanning line SCi. Referring to FIG. 1, there are q scanning lines in total in the display panel 100 to control the pixel circuits 200, 1≤i≤q. The scanning line Sci is one of the scanning lines SC1-SCq. In addition, when the adjustment circuits 400 are provided in the display panel 100, in order to control the adjustment circuits 400, a scanning line SC00, a scanning line SC01, . . . SCq+1, and SCq+2 . . . are provided, as shown in FIG. 8. One scanning line can control one row of adjustment circuits 400. The number of adjustment circuits 400 is determined according to an actual work need of the display panel 100.

For example, referring to FIG. 8, when the bias stage (adjustment stage T2) is after the data writing stage T1 in the display panel 100, in response to the data writing stage T2 of the pixel circuit 200 on the (S1)th row, there is no pixel circuit 200 in the bias stage (adjustment stage T2). In response to the data writing stage T1 of the pixel circuit 200 after the (S3)th row, there is one pixel circuit 200 in the adjustment stage T2 in the same period. Hence, in response to the data writing stage T1 of the pixel circuit 200 on the (S1)th row, load compensation is performed on the data line SL1 for transmitting the data voltage Vdata in this period. The load compensation can be realized by electrically connecting the first capacitor C1 to the data line SL1. Specifically, in response to the data writing stage T1 of the pixel circuit 200 on the (S1)th row, the scanning line SC00 transmits an enable signal to the control module 410 in the adjustment circuit 400. The control module 410 is turned on to electrically connect the first capacitor C1 to the data line SL1, thereby realizing the load compensation.

For example, referring to FIG. 9, when the pre-writing stage (adjustment stage T2) is before the data writing stage T1 in the display panel 100, in response to the data writing stage T1 of the pixel circuit 200 on the (Sq−1)th row, there is no pixel circuit 200 in the pre-writing stage (adjustment stage T2). In response to the data writing stage T1 of the pixel circuit 200 on the (S1)th row to the (Sq−2)th row, there is one pixel circuit 200 in the adjustment stage T2 in the same period. Hence, in response to the data writing stage T1 of the pixel circuit 200 on the (Sq−1)th row, load compensation is performed on the data line SL1 for transmitting the data voltage Vdata. The load compensation can be realized by electrically connecting the first capacitor C1 to the data line SL1. Specifically, in response to the data writing stage T1 of the pixel circuit 200 on the (Sq−1)th row, the scanning line SCq+1 transmits an enable signal to the control module 410 in the adjustment circuit 400 on the (Sq+1)th row. The control module 410 is turned on to electrically connect the first capacitor C1 to the data line SL1, thereby realizing the load compensation.

Figure 10:
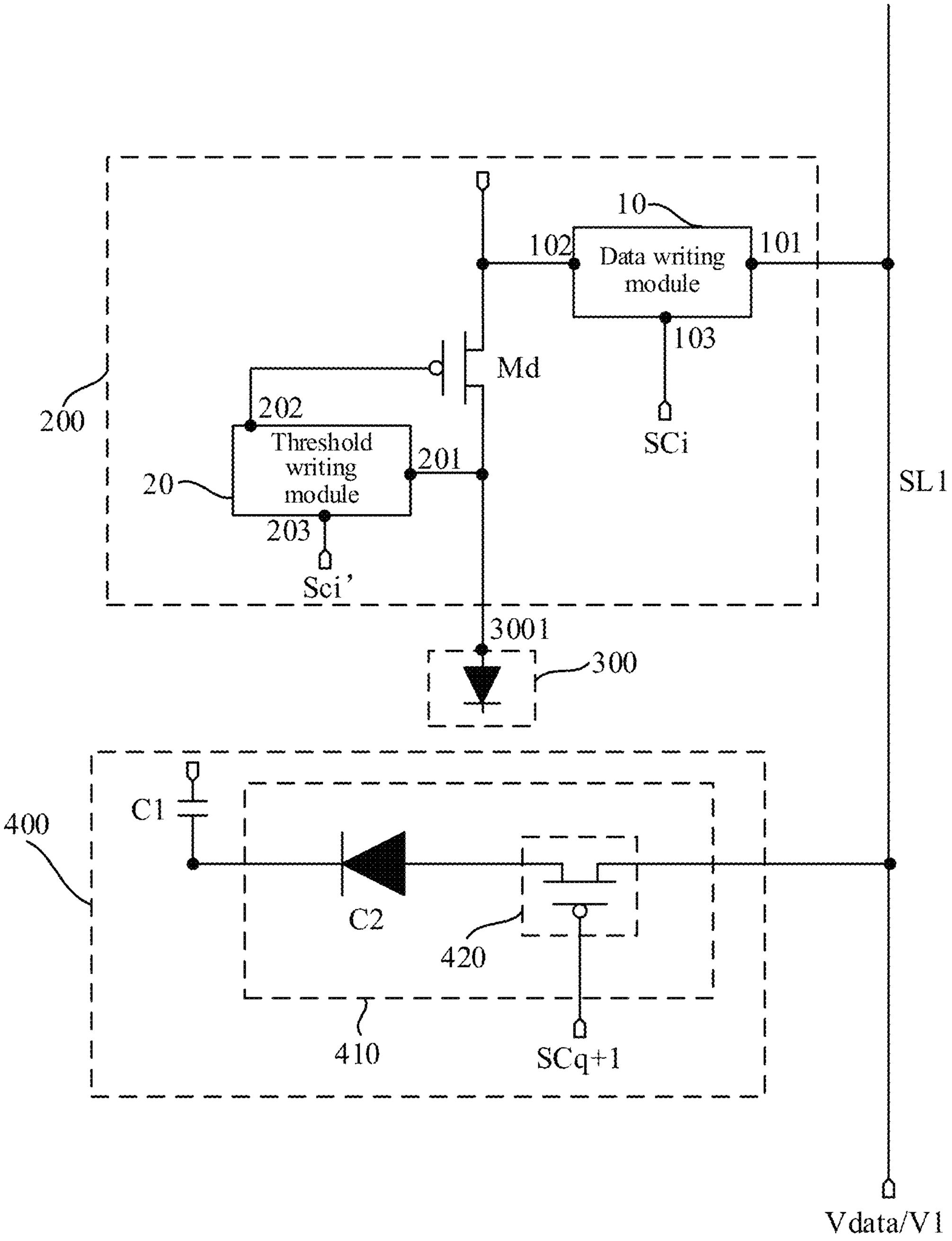
FIG. 10 is a schematic view of the pixel circuit shown in FIG. 2.
Figure 11:
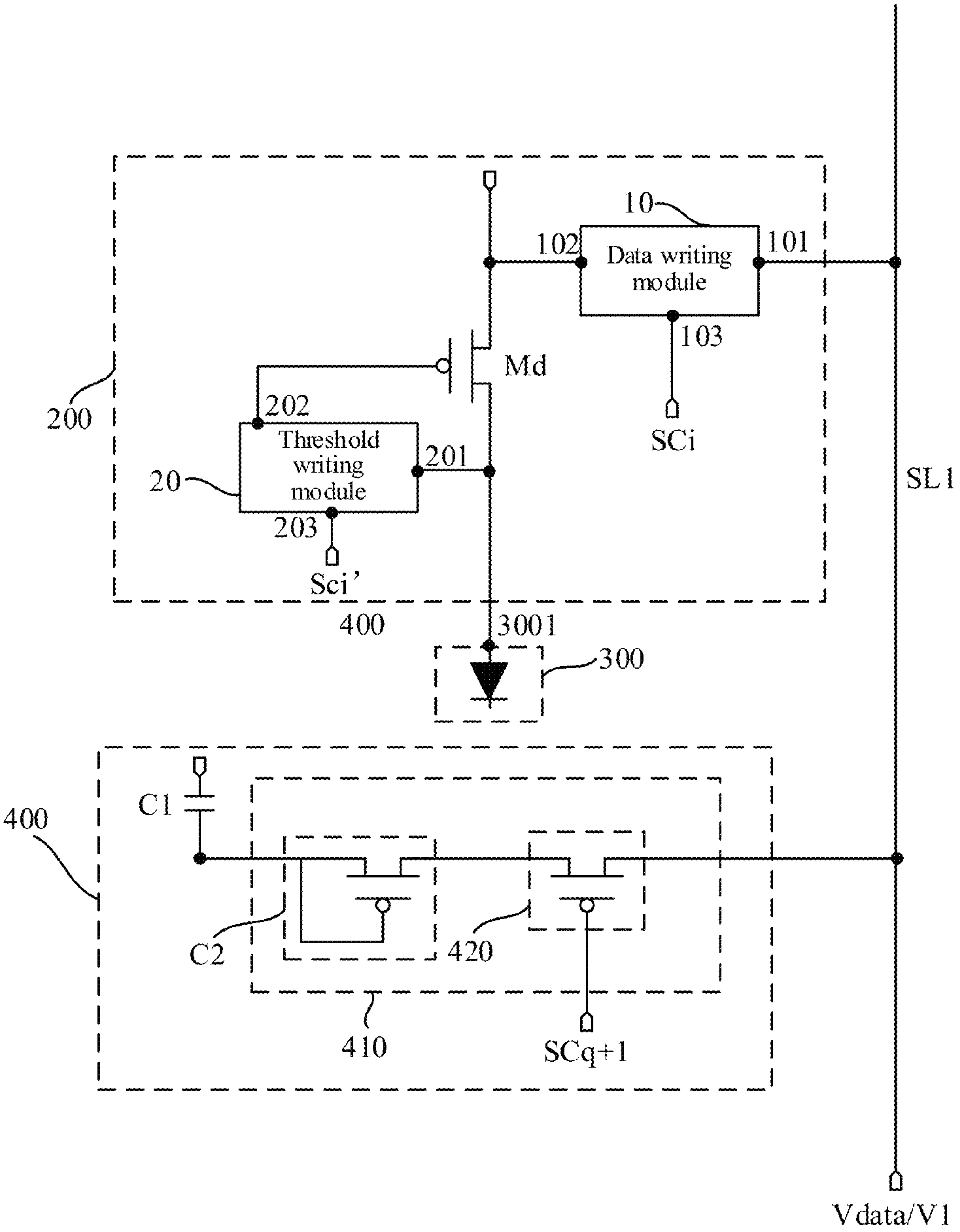
FIG. 11 is another schematic view of the pixel circuit shown in FIG. 2.

FIG. 10 is a schematic view of the pixel circuit shown in FIG. 2. FIG. 11 is another schematic view of the pixel circuit shown in FIG. 2.

In an embodiment of the present disclosure, as shown in FIG. 10 to FIG. 11, the control module 410 includes a first switch 420 and a diode C2. The first switch 420 includes a first end 421 electrically connected to the data line SL1, and a second end 422 electrically connected to an anode of the diode C2. A cathode of the diode C2 is electrically connected to the first electrode plate of the first capacitor C1.

In the embodiment of the present disclosure, the first switch 420 is provided to control whether the control module 410 is turned on. When the first switch 420 is turned on, the control module 410 is turned on. A control terminal of the first switch 420 may be the control terminal of the control module 410. In addition, the first switch 420 may be a transistor as shown in FIG. 10 and FIG. 11. The transistor corresponding to the first switch 420 includes a first electrode electrically connected to the data line SL1, a second electrode electrically connected to the anode of the diode C2, and a gate electrically connected to the control terminal of the control module 410.

When the first switch 420 is turned on, the anode of the diode C2 receives the data voltage Vdata from the data line SL1 and charges the first capacitor C1. This is conducive to taking the first capacitor C1 as the load of the data line SL1. Meanwhile, the cathode of the diode C2 is electrically connected to the first electrode plate of the first capacitor C1, such that a potential on the first electrode plate of the first capacitor C1 does not affect a voltage signal from the data line SL1 through the diode C2.

In an embodiment of the embodiment, the diode C2 is formed by electrically connecting one electrode of a transistor to the gate of the transistor. For example, as shown in FIG. 11, the transistor formed into the diode C2 is a P-channel transistor. The P-channel transistor includes a source electrically connected to the first switch 420, a drain electrically connected to the first capacitor C1, and a gate electrically connected to the drain of the P-channel transistor. In the implementation, the diode C2 may be prepared with the corresponding transistor of the first switch 420 and the transistor in the pixel circuit 200 at the same time. This simplifies a technical process and lowers a preparation cost.

Figure 12:
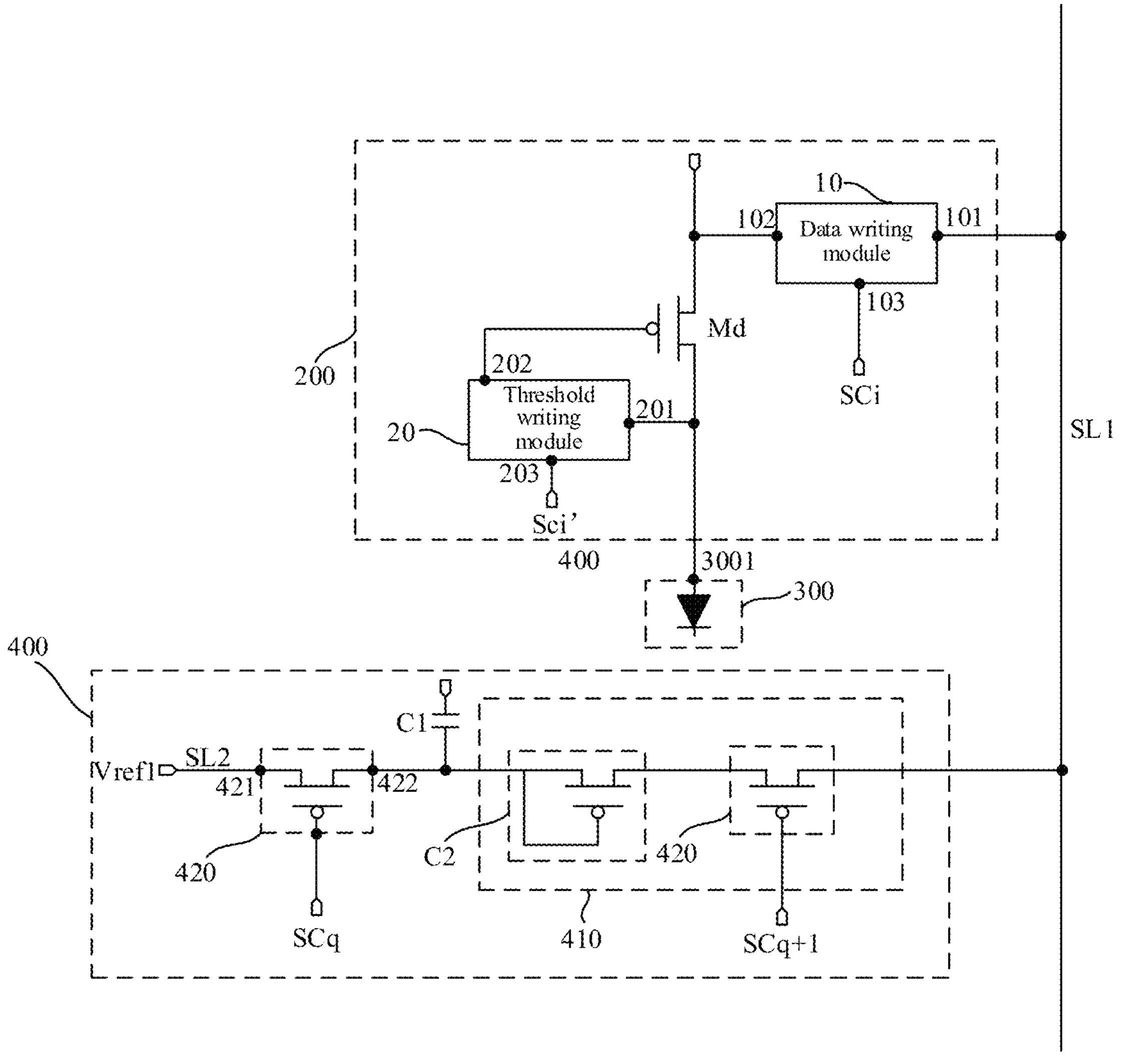
FIG. 12 is another schematic view of the pixel circuit shown in FIG. 2.

FIG. 12 is another schematic view of the pixel circuit shown in FIG. 2.

In an embodiment of the present disclosure, as shown in FIG. 12, the adjustment circuit 400 further includes an adjustment reset module 420. The adjustment reset module 420 includes a first end 421 electrically connected to a reset signal line, and a second end 422 electrically connected to the first electrode plate of the first capacitor C1.

In the embodiment of the present disclosure, the adjustment reset module 420 can reset the first electrode plate of the first capacitor C1. When the control module 410 is turned on, the first capacitor C1 shares the voltage on the data line SL quickly and effectively. That is, the first capacitor C1 can quickly become a useful load on the data line SL. This prevents the relatively low or high potential of the first capacitor C1 when the first capacitor is electrically connected to the data line SL, does not affect a charge quantity of the first capacitor C1, and does not make the first capacitor C1 applied inaccurately to the load of the data line SL1. In this way, the first capacitor is applied more accurately to the load of the data line SL1, thereby further ensuring uniform luminance of the light-emitting device 300 in the display panel 100, and improving the display effect.

Figure 13:
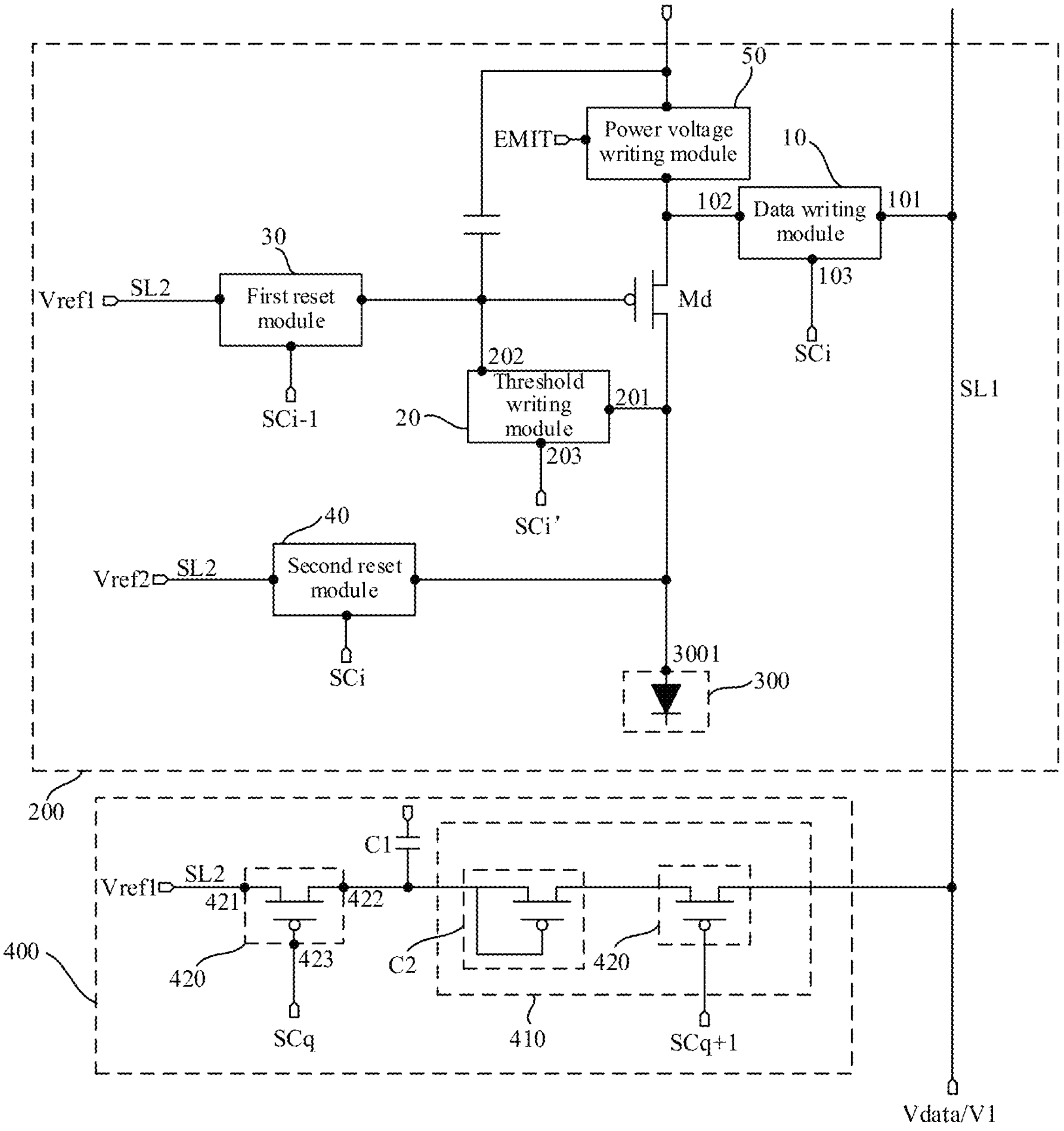
FIG. 13 is another schematic view of the pixel circuit shown in FIG. 2.

FIG. 13 is another schematic view of the pixel circuit shown in FIG. 2.

In an embodiment of the present disclosure, as shown in FIG. 13, the pixel circuit 200 further includes a first reset module 30. The first reset module 30 includes a first end 301 electrically connected to the reset signal line SL2, and a second end 302 electrically connected to a gate of the driving transistor Md. And/or, The pixel circuit 200 further includes a second reset module 40. The second reset module 40 includes a first end 401 electrically connected to the reset signal line SL2, and a second end 402 electrically connected to a first electrode 3001 of a light-emitting device 300. An output terminal of the pixel circuit 200 is electrically connected to the first electrode 3001 of the light-emitting device 300.

In an embodiment, the pixel circuit 200 may include the first reset module 30 and the second reset module 40. The first reset module 30, the second reset module 40 and the adjustment reset module 420 are electrically connected to a same reset signal line SL2.

In an embodiment, the pixel circuit 200 may include the first reset module 30. The first reset module 30 and the adjustment reset module 420 are electrically connected to a same reset signal line SL2. Meanwhile, even though the pixel circuit 200 includes the second reset module 40. The reset signal line SL2 electrically connected to the second reset module 40 is different from the reset signal line SL2 electrically connected to the adjustment reset module 420.

In an embodiment, the pixel circuit 200 may include the second reset module 40. The second reset module 40 and the adjustment reset module 420 are electrically connected to a same reset signal line SL2. Meanwhile, even though the pixel circuit 200 includes the first reset module 30. The reset signal line SL2 electrically connected to the first reset module 30 is different from the reset signal line SL2 electrically connected to the adjustment reset module 420.

When the pixel circuit 200 includes the first reset module 30, the first reset module 30 is turned on. The first reset module 30 receives a reset voltage Vref1 from the reset signal line SL2 and transmits the reset voltage to the gate of the driving transistor Md, thereby resetting the gate of the driving transistor Md. Optionally, the adjustment reset module 420 for resetting the first capacitor C1 in the adjustment circuit 400 and the first reset module 30 for resetting the gate of the driving transistor Md in the pixel circuit 200 are electrically connected to a same reset signal line. This prevents excessive traces to the display panel 100 and reduces a wiring difficulty of the display panel 100.

When the pixel circuit 200 includes the second reset module 40, the second reset module 40 is turned on. The second reset module 40 receives a reset voltage Vref2 from the reset signal line and transmits the reset voltage to the first electrode 3001 of the light-emitting device 300, thereby resetting the first electrode 3001 of the light-emitting device 300. Optionally, the adjustment reset module 420 for resetting the first capacitor C1 in the adjustment circuit 400 and the second reset module 40 for resetting the gate of the driving transistor Md in the pixel circuit 200 are electrically connected to a same reset signal line. This prevents excessive traces to the display panel 100 and reduces a wiring difficulty of the display panel 100.

In addition, the first reset module 30 and the second reset module 40 may be electrically connected to a same reset signal line, and may also be electrically connected to different reset signal lines. When the first reset module 30 and the second reset module 40 may be electrically connected to the same reset signal line, the adjustment reset module 420, the first reset module 30 and the second reset module 40 are electrically connected to the same reset signal line SL2.

Referring to FIG. 6 and FIG. 13, the first reset module 30 may include a third transistor M3. The third transistor M3 includes a first electrode receiving the reset voltage Vref1, a second electrode electrically connected to the gate of the driving transistor Md, and a gate electrically connected to a control line. The second reset module 40 may include a fourth transistor M4. The fourth transistor M4 includes a first electrode receiving the reset voltage Vref2, a second electrode electrically connected to the first electrode 3001 of the light-emitting device 300, and a gate electrically connected to the control line.

When the first reset module 30, the second reset module 40 and the adjustment reset module 420 are electrically connected to the same reset signal line SL2, the reset voltage Vref1 may be the same as the reset voltage Vref2.

Figure 14:
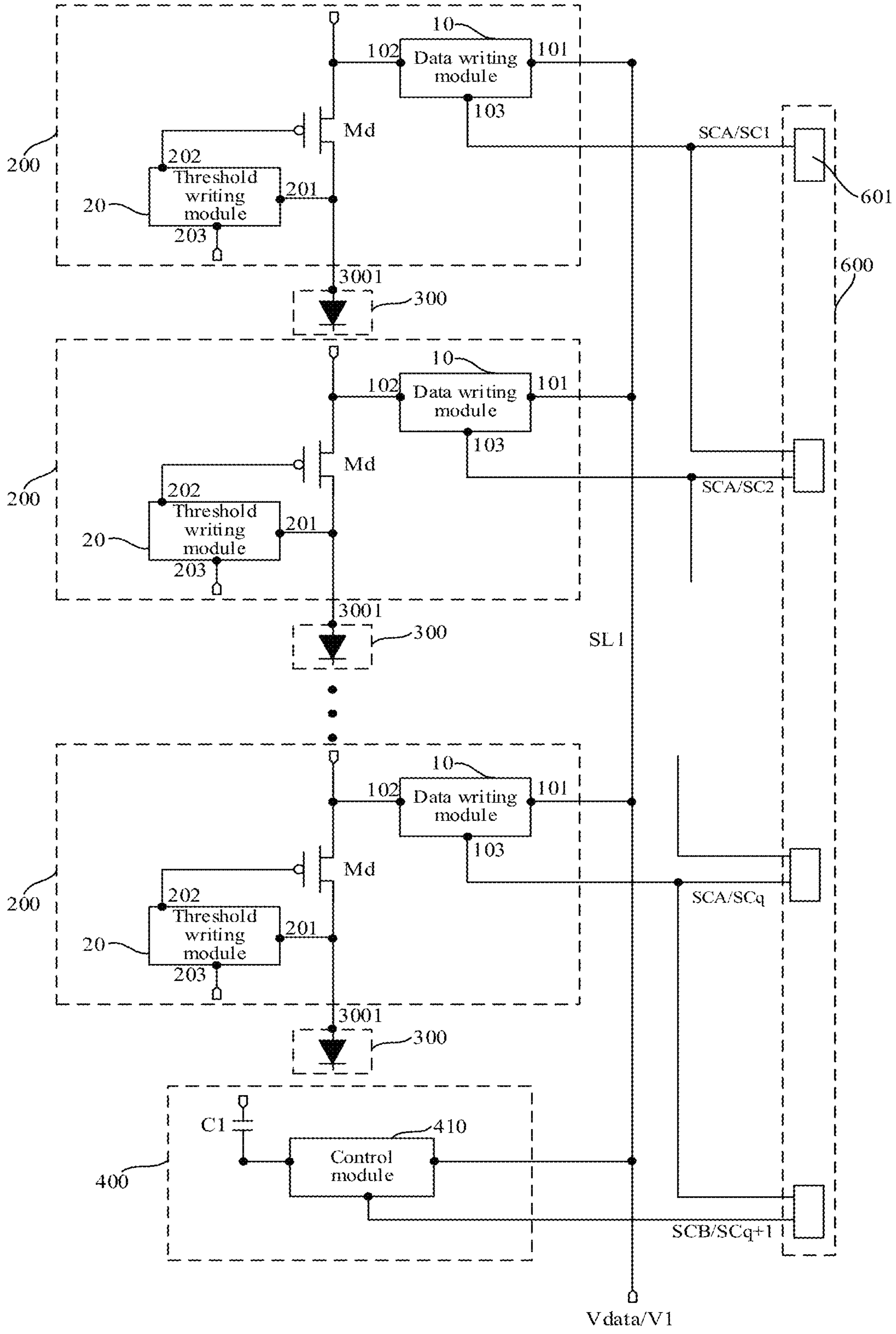
FIG. 14 is another schematic view of a pixel circuit according to an embodiment of the present disclosure.

FIG. 14 is another schematic view of a pixel circuit according to an embodiment of the present disclosure.

In an embodiment of the present disclosure, as shown in FIG. 14, the display panel 100 further includes a plurality of first scanning lines and a shift register circuit 600.

The plurality of first scanning lines include a first scanning sub-line SCA and a second scanning sub-line SCB. The first scanning sub-line SCA is electrically connected to a control terminal 103 of the data writing module 10. The second scanning sub-line SCB is electrically connected to a control terminal of the control module 410. That is, the first scanning sub-line SCA may be configured to control the pixel circuit 200, and the second scanning sub-line SCB may be configured to control the adjustment circuit 400.

As shown in FIG. 14, the shift register circuit 600 includes a plurality of cascaded shift registers 601. The first scanning lines are respectively electrically connected to output terminals of the shift registers 601. A control signal output from the shift register 601 is transmitted by the first scanning line to the control terminal 103 of the data writing module 10 in the pixel circuit 200 and the control module 410 in the adjustment circuit 400. That is, a scanning signal transmitted by the first scanning sub-line SCA to the pixel circuit 200 and a scanning signal transmitted by the second scanning sub-line SCB to the adjustment circuit 400 are provided by the cascaded shift registers 601. This neither increases computing power and an output port of the IC for the increased adjustment circuit 400, and nor increases the signal line on the display panel 100 excessively.

In an embodiment of the present disclosure, referring to FIG. 1, FIG. 9 and FIG. 14, in the work cycle T of the pixel circuit 200, the pre-writing stage (adjustment stage T2) is before the data writing stage T1. The shift register 601 electrically connected to the second scanning sub-line SCB is cascaded behind the shift register 601 electrically connected to the first scanning sub-line SCA.

As can be seen from the above analysis, when the pre-writing stage (adjustment stage T2) is before the data writing stage T1, in response to the data writing stage T1 of the pixel circuit 200 on later few rows in the display panel 100, the load on the data line SL1 is reduced. In this case, the shift register 601 for providing a control signal for the adjustment circuit 400 is cascaded behind the shift register 601 for providing a control signal for the data writing module 10 in the pixel circuit 200, and the adjustment circuit 400 can be turned on in the data writing stage T2 of the pixel circuit 200 on the later few rows to balance the load on the data line SL1.

For example, when the pixel circuit 200 on the (Sq−1)th row in the display panel 100 receives an enable signal transmitted by the scanning line SCA/SCq−1 for starting the data writing stage T1, under an cascade action between the shift registers 601, the adjustment circuit 400 on the (Sq+1)th row and behind the pixel circuit 200 in the display panel 100 also receives an enable signal transmitted by the scanning line SCB/SCq+1 for turning on the control module 410.

In this case, the same data line SL1 is electrically connected to the pixel circuit 400 on the (Sq−1)th row and the adjustment circuit 400 on the (Sq+1)th row.

In the embodiment of the present disclosure, the pre-writing stage (adjustment stage T2) is before the data writing stage T1, and the shift register 601 electrically connected to the second scanning sub-line SCB is cascaded behind the shift register 601 electrically connected to the first scanning sub-line SCA. This prevents the problem that the load on the data line SL1 is reduced in response to the data writing stage T1 of the pixel circuit 200 on the later few rows when the adjustment stage T2 is performed first, balances the load of the data line SL1 in each period, and prevents an obvious deviation of the output data voltage Vdata.

Figure 15:
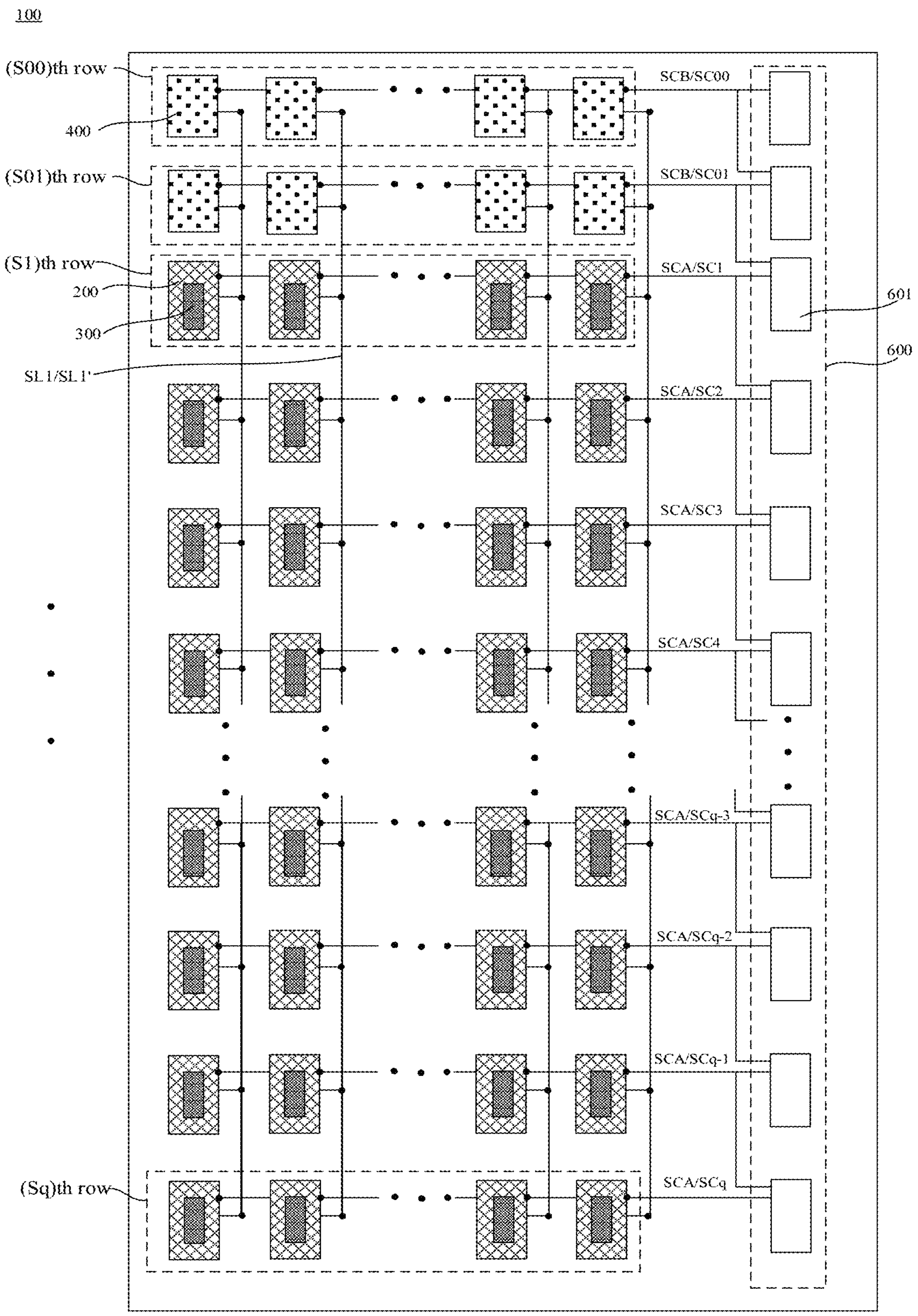
FIG. 15 is another schematic view of a display panel according to an embodiment of the present disclosure.
Figure 16:
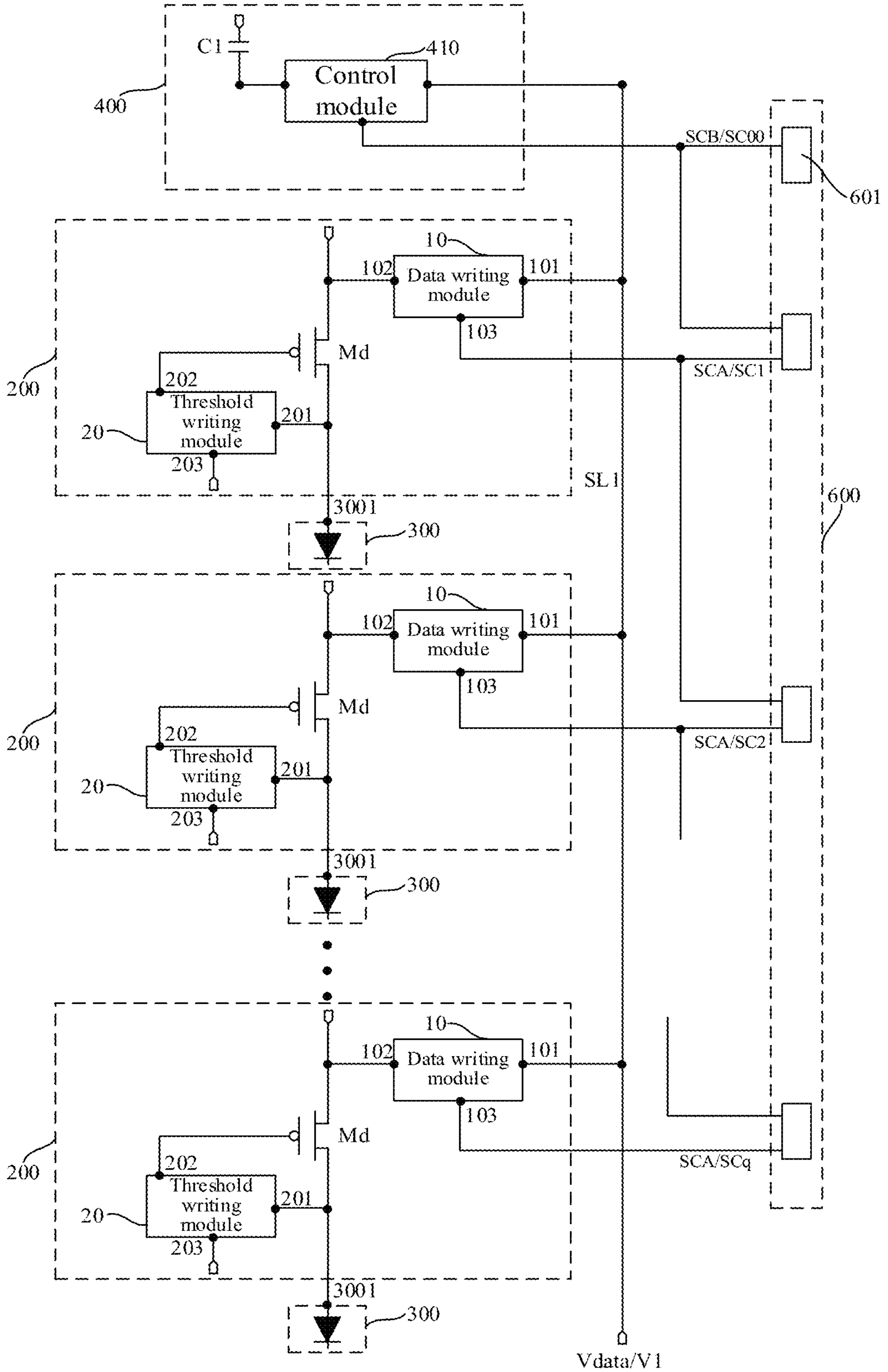
FIG. 16 is another schematic view of a pixel circuit according to an embodiment of the present disclosure.

FIG. 15 is another schematic view of a display panel according to an embodiment of the present disclosure. FIG. 16 is another schematic view of a pixel circuit according to an embodiment of the present disclosure.

In an embodiment of the present disclosure, referring to FIG. 8, FIG. 15 and FIG. 16, in the work cycle T of the pixel circuit 200, the bias stage (adjustment stage T2) is after the data writing stage T1.

The shift register 601 electrically connected to the first scanning sub-line SCA is cascaded behind the shift register 601 electrically connected to the second scanning sub-line SCB.

As can be seen from the above analysis, when the bias stage (adjustment stage T2) is after the data writing stage T1, in response to the data writing stage T1 of the pixel circuit 200 on front few rows in the display panel 100, the load on the data line SL1 is reduced. In this case, the shift register 601 for providing a control signal for the adjustment circuit 400 is cascaded behind the shift register 601 for providing a control signal for the data writing module 10 in the pixel circuit 200, and the adjustment circuit 400 can be turned on in the data writing stage T2 of the pixel circuit 200 on the front few rows to balance the load on the data line SL1.

For example, when the adjustment circuit 400 on the (S00)th row in the display panel 100 receives an enable signal transmitted by the scanning line SCB/SC00, the control module 410 is turned on, and the data line SL1 is electrically connected to the first capacitor C1. Meanwhile, under an cascade action between the shift registers 601, the pixel circuit 200 on the (S1)th row and behind the adjustment circuit 400 in the display panel 100 also receives an enable signal transmitted by the scanning line SCA/SC1 for turning on the data writing module 10, and the pixel circuit 200 on the (S1)th row goes to the data writing stage T1. In this case, the same data line SL1 is electrically connected to the pixel circuit 400 on the (S1)th row and the adjustment circuit 400 on the (S00)th row.

In the embodiment of the present disclosure, the bias stage (adjustment stage T2) is after the data writing stage T1, and the shift register 601 electrically connected to the second scanning sub-line SCB is cascaded in front of the shift register 601 electrically connected to the first scanning sub-line SCA. This prevents the problem that the load on the data line SL1 is reduced in response to the data writing stage T1 of the pixel circuit 200 on the front few rows when the adjustment stage T2 is performed later, balances the load of the data line SL1 in each period, and prevents an obvious deviation of the output data voltage Vdata.

Figure 17:
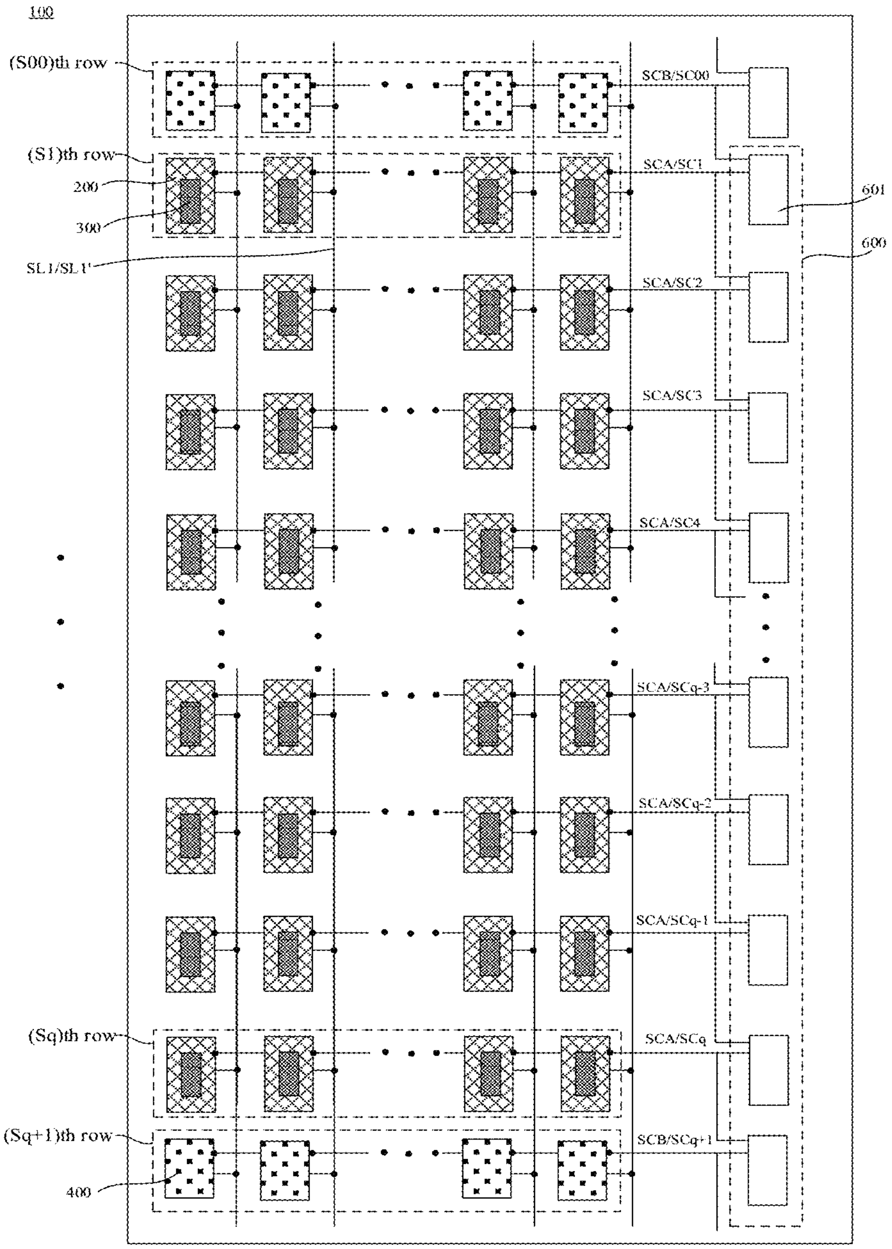
FIG. 17 is another schematic view of a display panel according to an embodiment of the present disclosure.
Figure 18:
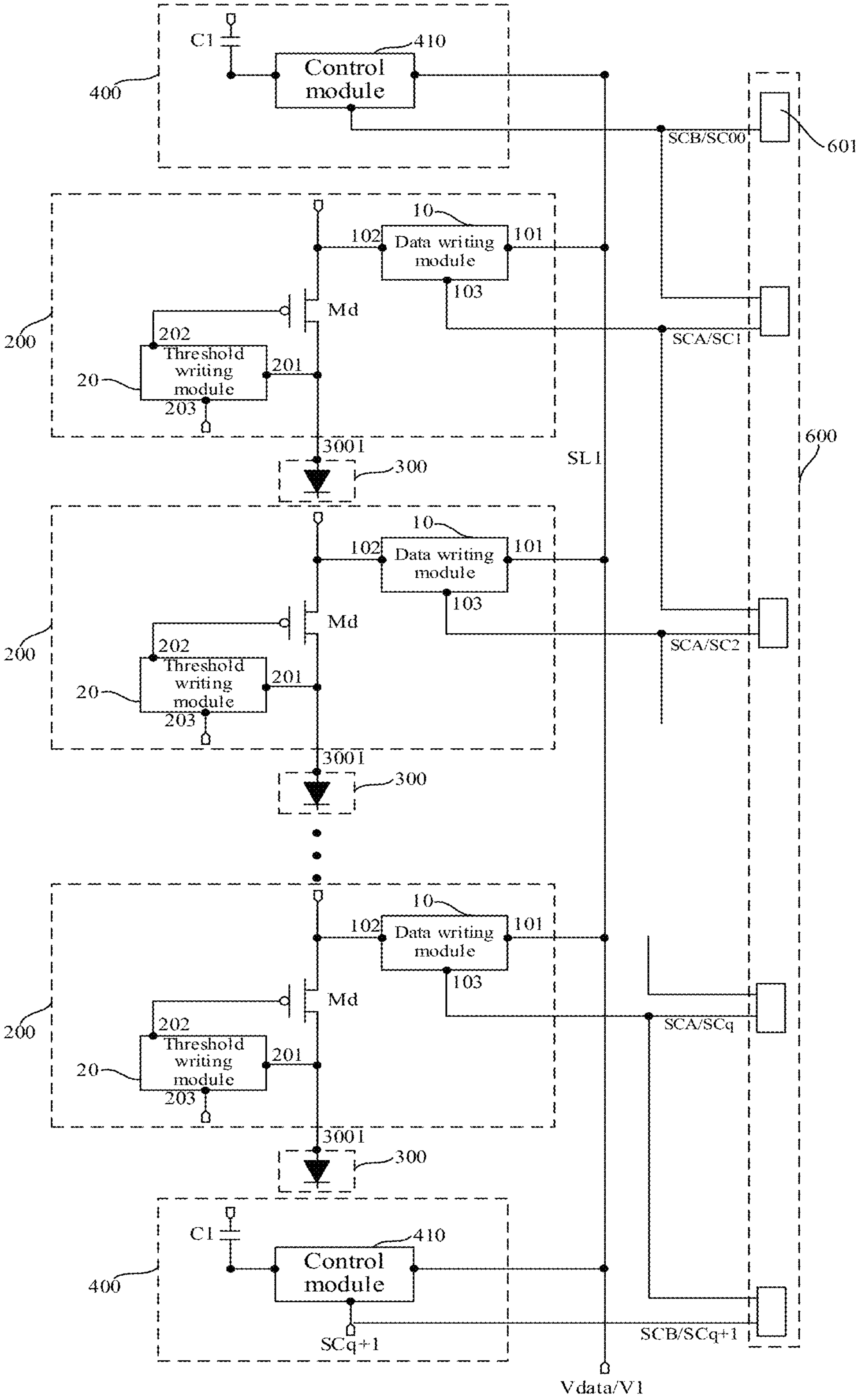
FIG. 18 is another schematic view of a pixel circuit according to an embodiment of the present disclosure.
Figure 19:
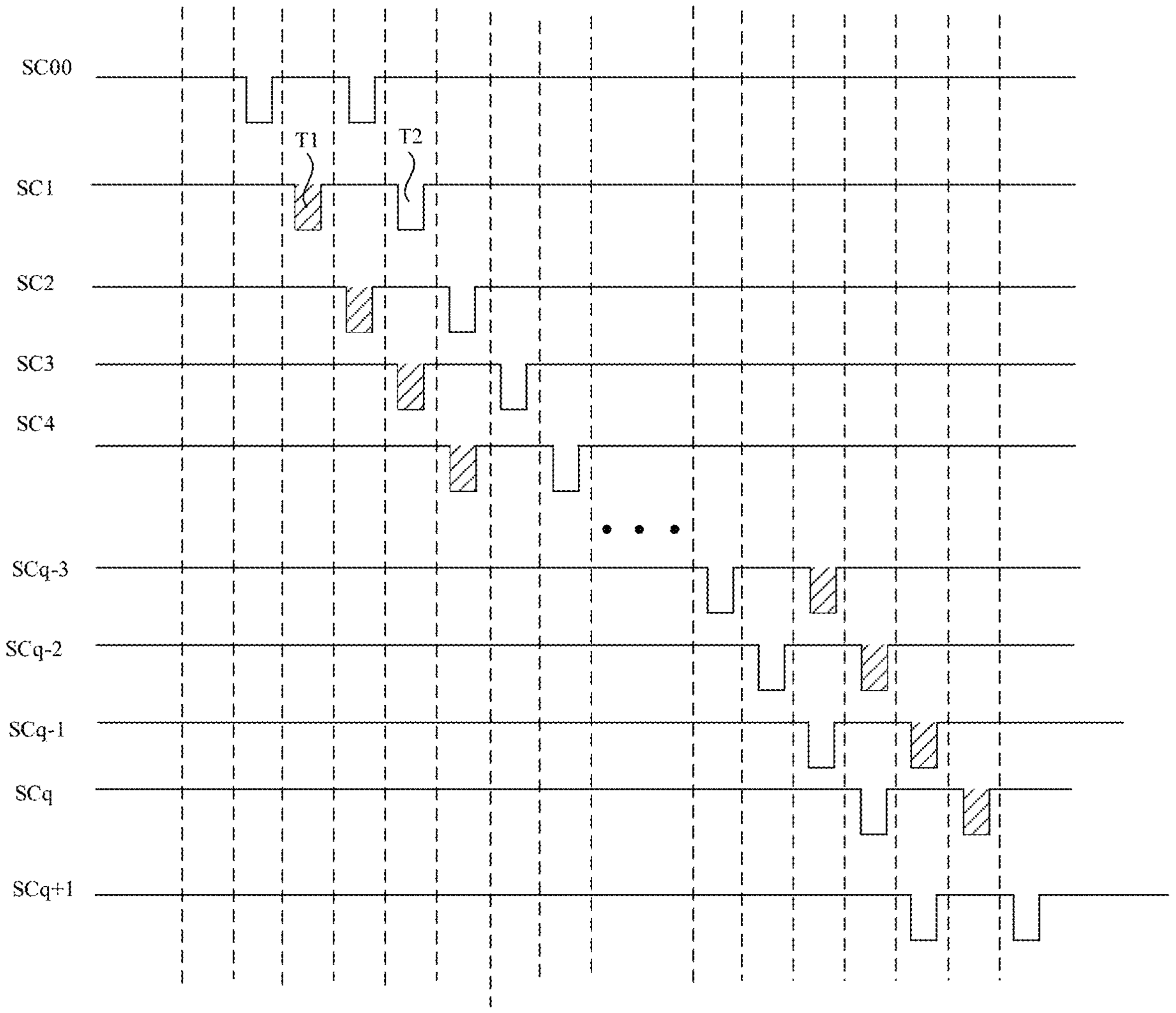
FIG. 19 illustrates another driving time sequence of a display panel according to an embodiment of the present disclosure.

FIG. 17 is another schematic view of a display panel according to an embodiment of the present disclosure. FIG. 18 is another schematic view of a pixel circuit according to an embodiment of the present disclosure. FIG. 19 illustrates another driving time sequence of a display panel according to an embodiment of the present disclosure.

In an embodiment of the present disclosure, referring to FIG. 17 to FIG. 19, in the work cycle T of the pixel circuit 200, at least one adjustment stage T2 is before the data writing stage T1, and at least one adjustment stage T2 is after the data writing stage T1.

The shift register 601 electrically connected to at least one second scanning sub-line SCB is cascaded in front of the shift register 601 electrically connected to the first scanning sub-line SCA. The shift register 601 electrically connected to at least one second scanning sub-line SCB is cascaded behind the shift register 601 electrically connected to the first scanning sub-line SCA.

As can be seen from the above analysis, when the pre-writing stage (adjustment stage T2) is before the data writing stage T1 in the work cycle of the pixel circuit 200, the load compensation is performed on the data line SL1 connected to the pixel circuit 200 on the later few rows in the pixel circuit 200. When the bias stage (adjustment stage T2) is after the data writing stage T1 in the work cycle of the pixel circuit 200, the load compensation is performed on the data line SL1 connected to the pixel circuit 200 on the front few rows in the pixel circuit 200. When the work cycle of the pixel circuit 200 includes the pre-writing stage and the bias stage at the same time, the control module in at least one adjustment circuit 400 is turned on in response to the data writing stage T1 of the pixel circuit 200 on the front few rows, and the control module in at least one adjustment circuit 400 is turned on in response to the data writing stage T1 of the pixel circuit 200 on the later few rows.

For example, in response to the data writing stage T1 of the pixel circuit 200 on the (Sq−1)th row, the scanning line SCB/SCq+1 also transmits an enable signal to turn on the control module 410 in the adjustment circuit 400. The same data line SL1 is electrically connected to the pixel circuit 200 on the (Sq−1)th row and the adjustment circuit 400 on the (Sq+1)th row. In response to the data writing stage T1 of the pixel circuit 200 on the (S2)th row, the scanning line SCB/SC00 also transmits an enable signal to turn on the control module 410 in the adjustment circuit 400. The same data line SL1 is electrically connected to the pixel circuit 200 on the (S2)th row and the adjustment circuit 400 on the (S00)th row.

In the embodiment of the present disclosure, when the pixel circuit 200 in the display panel 100 includes the bias stage (adjustment stage T2) and the pre-writing stage (adjustment stage T2), the shift register 601 electrically connected to at least one second scanning sub-line SCB is cascaded in front of the shift register 601 electrically connected to the first scanning sub-line SCA, and the shift register 601 electrically connected to at least one second scanning sub-line SCB is cascaded behind the shift register 601 electrically connected to the first scanning sub-line SCA. While relieving non-uniform luminance of the light-emitting device 300 driven by the pixel circuit 200 on the front few row or the later few rows in the display panel 100, this neither increases a computing power and an output port of the IC for the increased adjustment circuit 400, and nor increases the signal line on the display panel 100 excessively.

Figure 20:
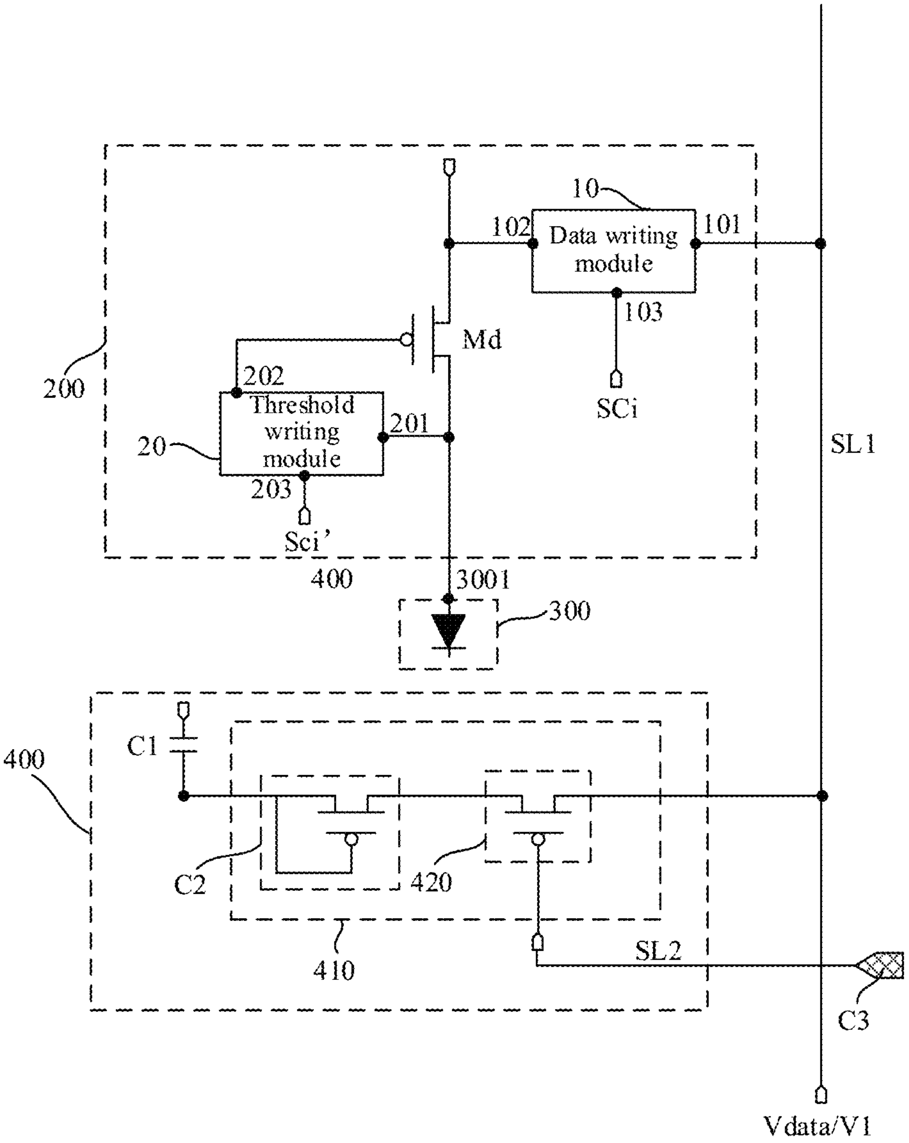
FIG. 20 is another schematic view of a pixel circuit according to an embodiment of the present disclosure.

FIG. 20 is another schematic view of a pixel circuit according to an embodiment of the present disclosure.

In an embodiment of the present disclosure, as shown in FIG. 20, the display panel 100 further includes a control line SL2 and a pin C3. The control line SL2 is electrically connected to a control terminal of the control module 410. One terminal SL2 of the control line SL2 is electrically connected to the pin C3.

The pin C3 may be electrically connected to a control chip, and receives a signal transmitted by the control chip to realize independent control on the adjustment circuit 400. A control signal received by the pin C3 is transmitted by the control line SL2 to the control terminal of the control module 410.

In the embodiment of the present disclosure, the control line SL2 and the pin C3 in the display panel 100 independently receive a control signal for controlling the control module 410 in the adjustment circuit 400. The control module 410 can be turned on more flexibly to electrically connect the first capacitor C1 to the corresponding data line SL1. Meanwhile, a number of first capacitors C1 electrically connected to the data line SL1 is controlled flexibly to adaptively adjust the load connected to the data line SL1.

In an embodiment of the present disclosure, the work cycle T of the pixel circuit 200 includes the data writing stage T1 and k adjustment stages T2. The data line SL1 is electrically connected to (2*k−x) adjustment circuits 400, 2*k>x≥0, and x being an integer. The same data line SL1 is electrically connected to at least one adjustment circuit 400 and electrically connected to at most 2 k adjustment circuits 400. The data line SL1 is electrically connected to at least one adjustment circuit 400, which can ensure that the load compensation is performed on the data line SL1. The data line SL1 is electrically connected to at most 2 k adjustment circuits 400, which can prevent excessive increase of the adjustment circuit 400 to affect a width of a non-display region of the display panel 100.

In an embodiment of the present disclosure, x=1 or x=0.

In the embodiment of the present disclosure, in response to x=1, namely (2*k−1) adjustment circuits 400 are provided on the data line SL1, except the pixel circuit 200 on a last row, a number of circuits loaded in the data writing stages T1 of other pixel circuits 200 is basically the same.

Figure 21:
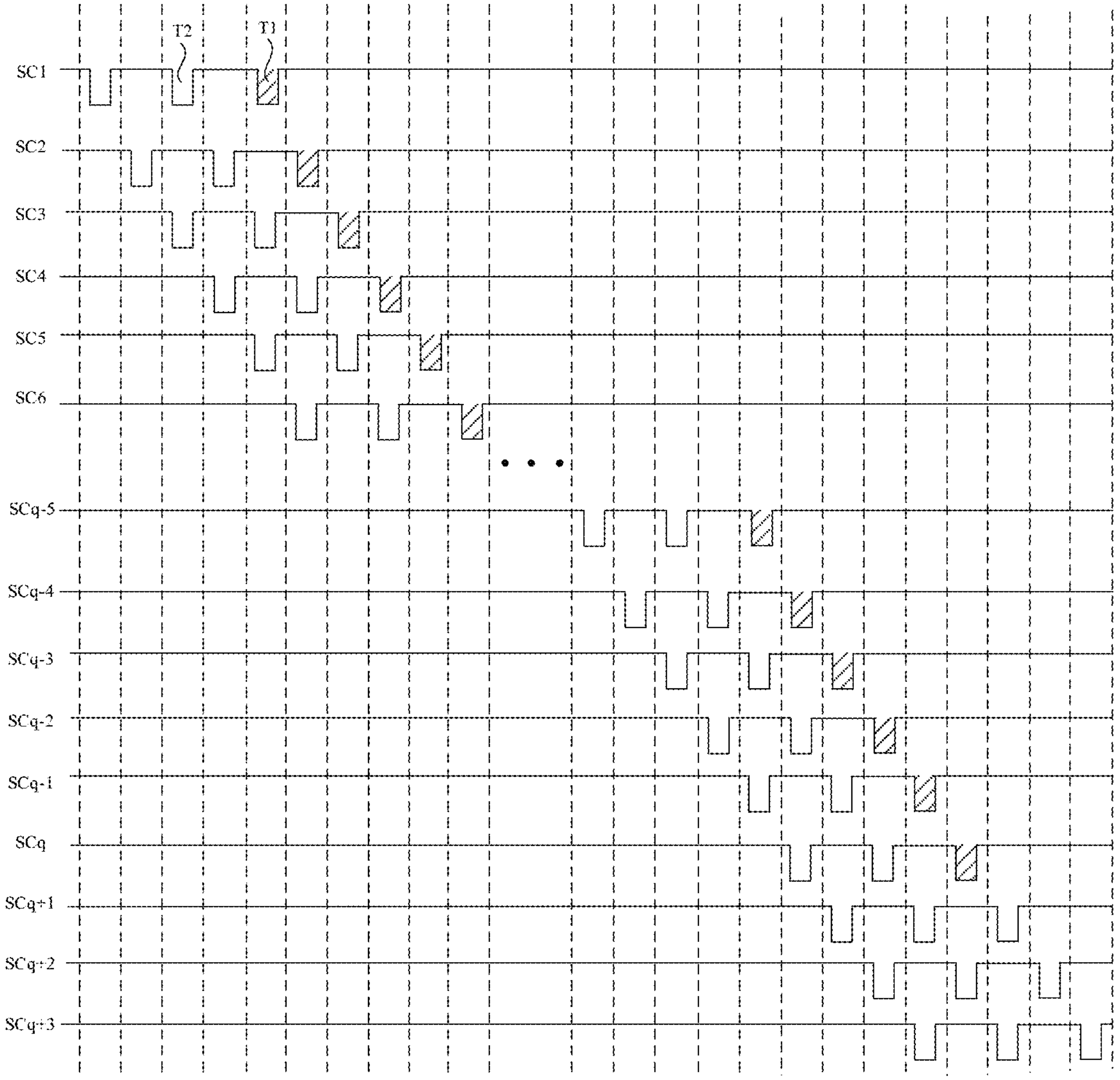
FIG. 21 illustrates another driving time sequence of a display panel according to an embodiment of the present disclosure.

FIG. 21 illustrates another driving time sequence of a display panel according to an embodiment of the present disclosure. For example, in response to k=2 and x=1, three adjustment circuits 400 are provided on the data line SL1. As shown in FIG. 21, the three adjustment circuits 400 are respectively connected to the second scanning sub-line SCq+1, the second scanning sub-line SCq+2, and the second scanning sub-line SCq+3. As shown in FIG. 21, except the pixel circuit 200 on the last row, a number of circuits loaded in the data writing stages T1 of other pixel circuits 200 is basically the same.

In the embodiment of the present disclosure, in response to x=0, that is (2*k) adjustment circuits 400 are provided on the data line SL1, a number of circuits loaded on the data line SL1 in any data writing stage T1 can be basically the same.

In an embodiment of the present disclosure, in response to x=2*k−1, one adjustment circuit 400 is provided on the data line SL1. With one adjustment circuit 400, a space of the display panel 100 is saved, and a case where a plurality of adjustment circuits 400 are provided to affect other circuits is prevented.

For example, the work cycle T of the pixel circuit 200 includes the data writing stage T1 and two adjustment stages T2. In this case, k=2 and x=3. That is, 2*k−3 adjustment circuits 400 are provided on the data line SL1, and in other words, one adjustment circuit 400 is provided.

Figure 22:
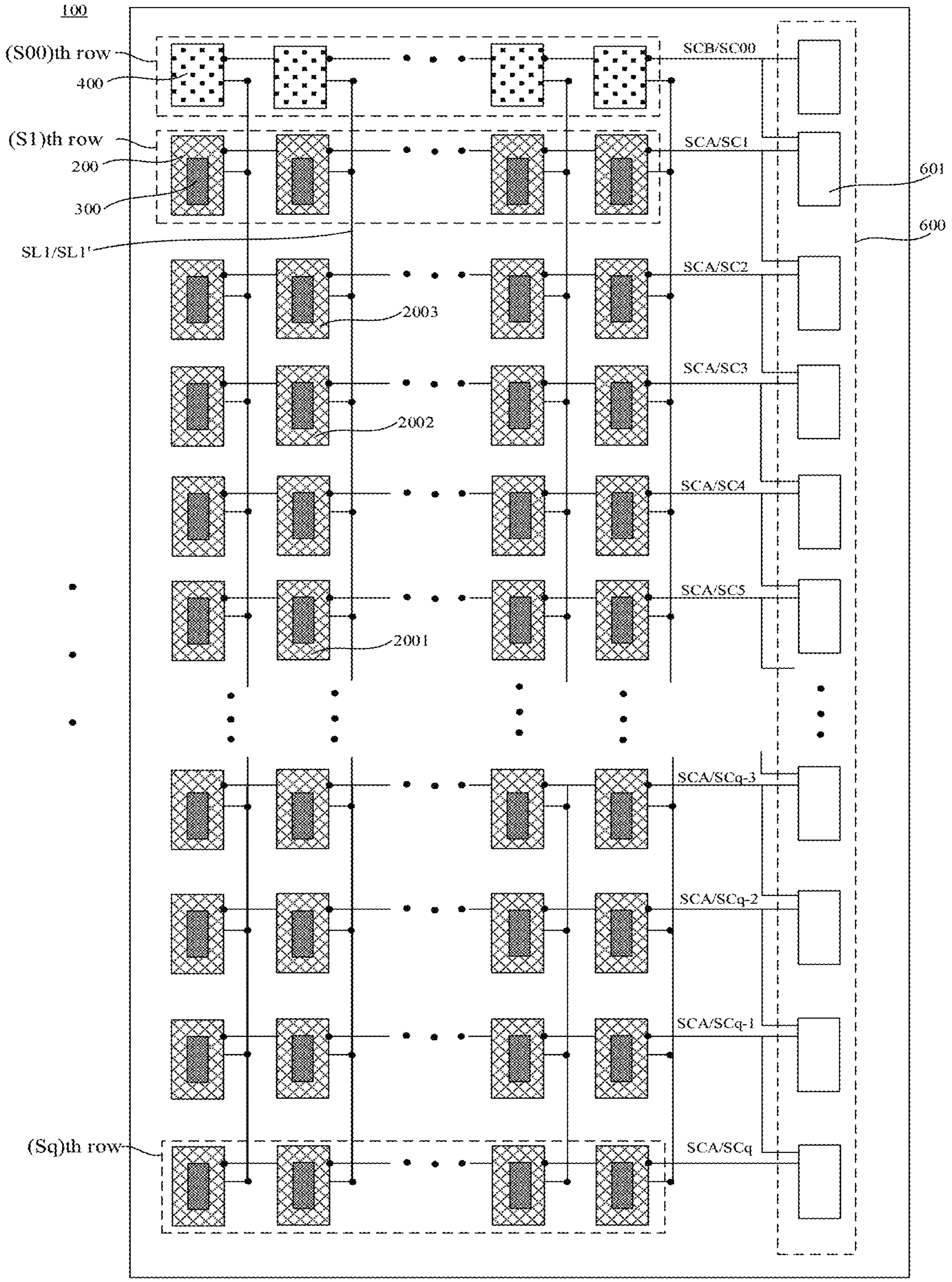
FIG. 22 is another schematic view of a display panel according to an embodiment of the present disclosure.
Figure 23:
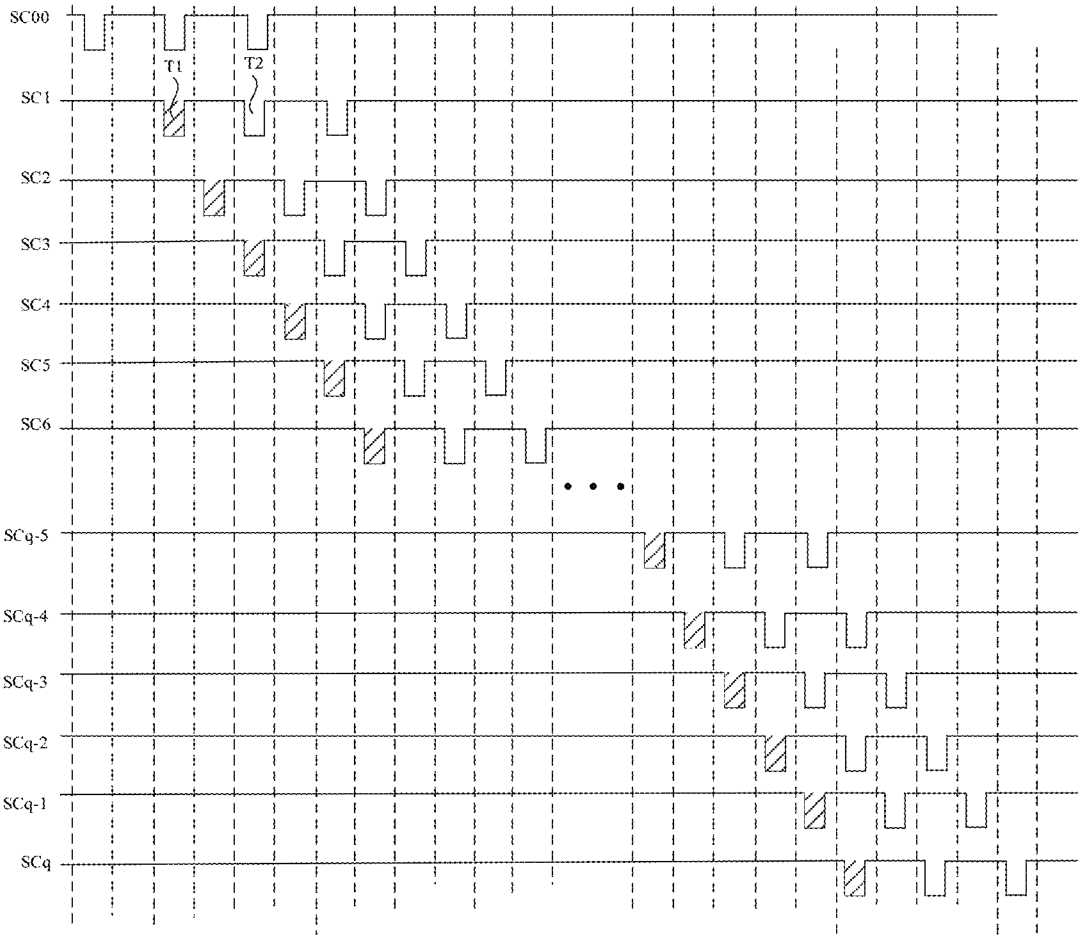
FIG. 23 illustrates another driving time sequence of a display panel according to an embodiment of the present disclosure.
Figure 24:
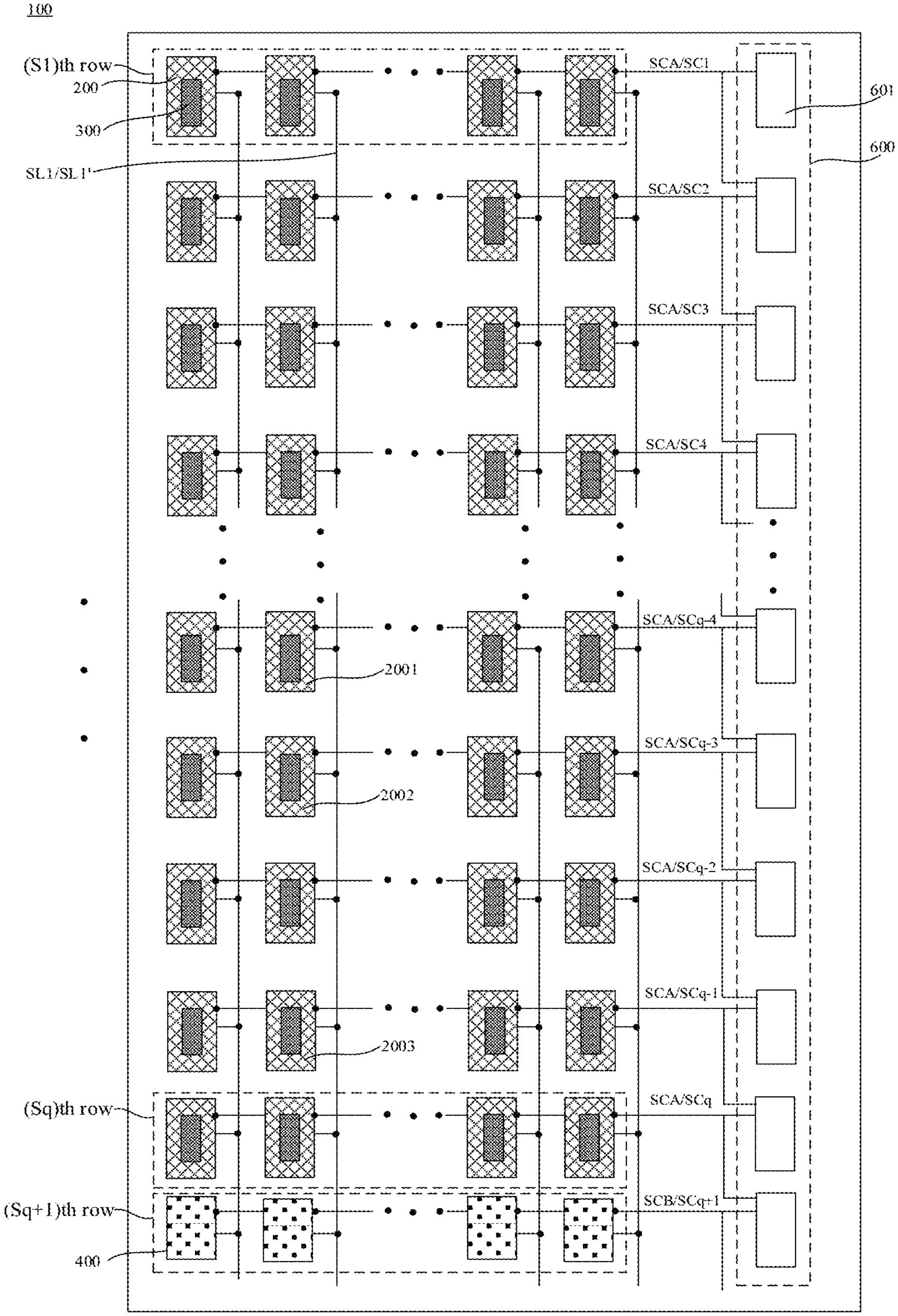
FIG. 24 is another schematic view of a display panel according to an embodiment of the present disclosure.
Figure 25:
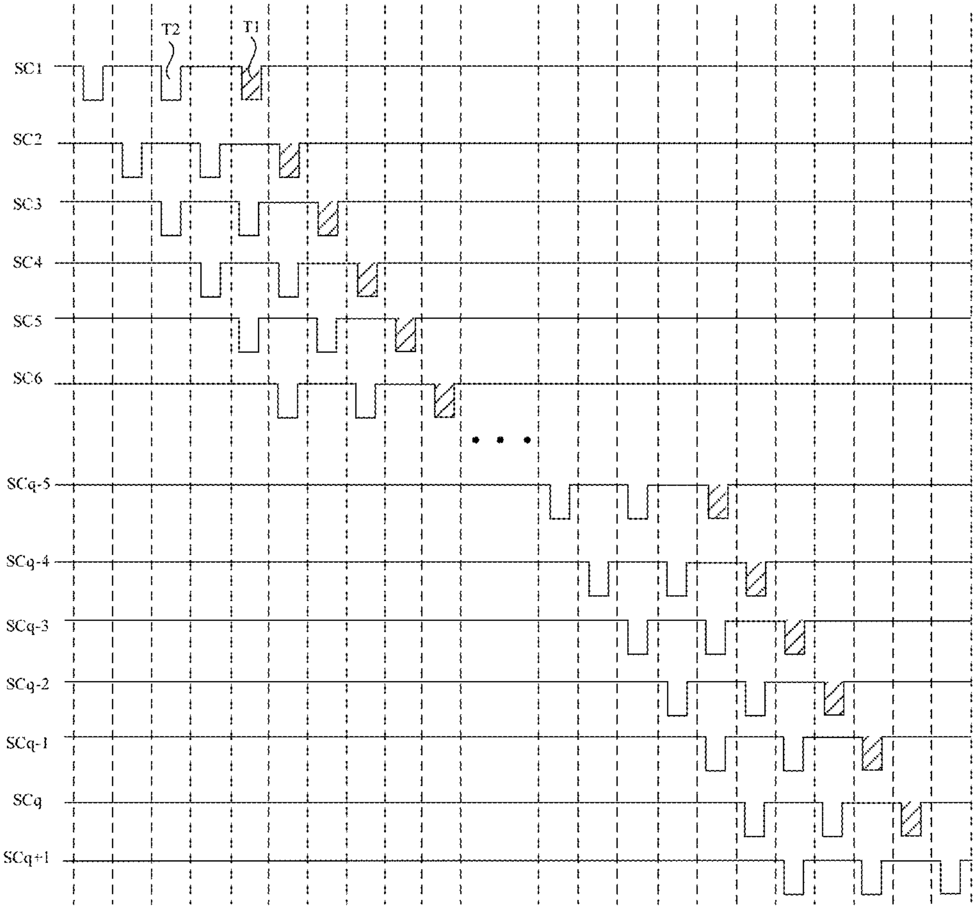
FIG. 25 illustrates another driving time sequence of a display panel according to an embodiment of the present disclosure.

FIG. 22 is another schematic view of a display panel according to an embodiment of the present disclosure. FIG. 23 illustrates another driving time sequence of a display panel according to an embodiment of the present disclosure. FIG. 24 is another schematic view of a display panel according to an embodiment of the present disclosure. FIG. 25 illustrates another driving time sequence of a display panel according to an embodiment of the present disclosure.

In an embodiment of the present disclosure, the data line SL1 is electrically connected to a plurality of adjustment circuits 400.

Referring to FIG. 22 and FIG. 24, in the plurality of pixel circuits 200 electrically connected to the target data line SL1', in response to the data writing stage T1 of a third pixel circuit 2003, p pixel circuits 200 are in the adjustment stage T2, n>p. The third pixel circuit is the pixel circuit 200 electrically connected to the target data line SL1'.

In a plurality of pixel circuits 200 electrically connected to a same data line SL, compared with the data writing stage T1 of the first pixel circuit 2001 and the data writing stage T1 of the second pixel circuit 2002, a number of pixel circuits 200 in the adjustment stage T2 is smaller in the data writing stage T1 of the third pixel circuit.

For example, referring to FIG. 22 and FIG. 23, when the bias stage (adjustment stage T2) is after the data writing stage T1, in response to the data writing stage T1 of the first pixel circuit 2001 on the (S5)th row, m pixel circuits 200 in the pixel circuits 200 connected to the target data line SL1' are in the adjustment stage T2, m=2. In response to the data writing stage T2 of the second pixel circuit 2002 on the (S3)th row, n pixel circuits 200 in the pixel circuits 200 connected to the target data line SL1' are in the adjustment stage T2, n=1. In response to the data writing stage T2 of the third pixel circuit 2003 on the (S2)th row, p pixel circuits 200 in the pixel circuits 200 connected to the target data line SL1' are in the adjustment stage T2, p=0. In this case, the third pixel circuit 2003 is closer to the upper frame of the display panel 100. With reference to the above example, it can be concluded that when the bias stage (adjustment stage T2) is after the data writing stage T1, the data voltage Vdata received by the pixel circuit 200 closer to the upper frame of the display panel 100 has a larger deviation.

For example, referring to FIG. 24 and FIG. 25, when the pre-writing stage (adjustment stage T2) is before the data writing stage T1, in response to the data writing stage T1 of the first pixel circuit 2001 on the (Sq−5)th row, m pixel circuits 200 in the pixel circuits 2001 connected to the target data line SL1' are in the adjustment stage T2, m=2. In response to the data writing stage T2 of the second pixel circuit 2002 on the (Sq−3)th row, n pixel circuits 200 in the pixel circuits 200 connected to the target data line SL1' are in the adjustment stage T2, n=1. In response to the data writing stage T2 of the third pixel circuit 2003 on the (Sq)th row, p pixel circuits 200 in the pixel circuits 200 connected to the target data line SL1' are in the adjustment stage T2, p=0. In this case, the third pixel circuit 2003 is closer to the upper frame of the display panel 100. With reference to the above example, it can be concluded that when the pre-writing stage (adjustment stage T2) is before the data writing stage T1, the data voltage Vdata received by the pixel circuit 200 closer to the upper frame of the display panel 100 has a larger deviation.

In conclusion, the third pixel circuit 2003 is closer to the upper frame and/or the lower frame of the display panel 100. The obvious difference between the display luminance closer to the upper frame and the lower frame of the display panel 100 and the display luminance at other positions cannot be perceived by human eyes easily. Hence, compensation requirements on the luminance closer to the upper frame and the lower frame can be lowered to some extent.

In the embodiment, in response to the data writing stage T1 of the second pixel circuit 2002, a number of first capacitors C1 electrically connected to the target data line SL1' is a. In response to the data writing stage T1 of the third pixel circuit 2003, a number of first capacitors C1 electrically connected to the target data line SL1' is b, a>b. For example, as shown in FIG. 23, the second pixel circuit 2002 is the pixel circuit 200 on the (S3)th row, and a=1. The third pixel circuit 2003 is the pixel circuit 200 on the (S2)th row and b=0. For example, as shown in FIG. 25, the second pixel circuit 2002 is the pixel circuit 200 on the (Sq−3)th row, and a=1. The third pixel circuit 2003 is the pixel circuit 200 on the q th row and b−0. In a plurality of pixel circuits 200 electrically connected to a same data line SL, compared with the load compensation in the data writing stage T1 of the first pixel circuit 2001 and the data writing stage T1 of the second pixel circuit 2002, the load compensation in the data writing stage T1 of the third pixel circuit 2003 is less, so as not to increase the adjustment module 400 excessively.

In an embodiment of the present disclosure, referring to FIG. 22, FIG. 23, FIG. 24 and FIG. 25, b=0.

In the embodiment of the present disclosure, since the third pixel circuit 2003 is closer to the upper frame or the lower frame of the display panel 100, some differences in the luminance of the light-emitting device 300 driven by the third pixel circuit 2003 are not perceived by the human eyes easily, and the load compensation may not be performed on the connected target data line SL1' in the data writing stage T1 of the third pixel circuit 2003. This makes the circuit operation less complex.

Figure 26:
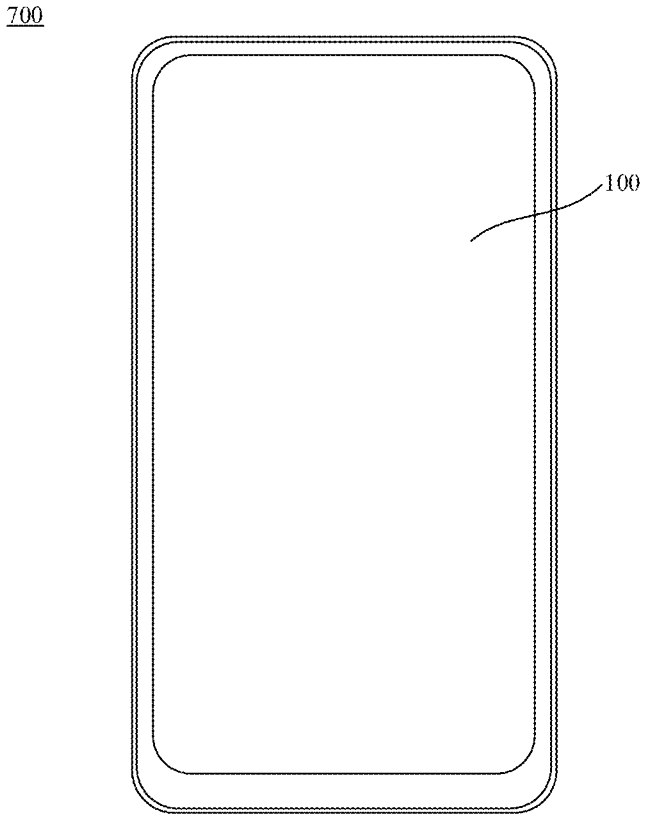
FIG. 26 is a schematic view of a display apparatus according to an embodiment of the present disclosure.

FIG. 26 is a schematic view of a display apparatus according to an embodiment of the present disclosure.

The embodiment of the present disclosure provides a display apparatus 700. As shown in FIG. 26, the display apparatus 700 includes the display panel 100 provided in the above embodiment. The display apparatus 700 provided in the embodiment of the present disclosure may be a mobile phone. In addition, the display apparatus 700 may further be a computer, a television, or other display apparatuses.

In the display apparatus 700, the capacitor can keep a stable potential of a node electrically connected to the capacitor. By taking the first capacitor C1 in the adjustment circuit 400 as a device for balancing loads of the target data line SL1' in different work periods, a big difference between the loads connected to the target data line SL1' in the different periods can be prevented.

The above descriptions are merely preferred embodiments of the present disclosure and are not intended to limit the present disclosure. Any modification, equivalent replacement and improvement within the spirit and principle of the present disclosure shall be included within the protection scope of the present disclosure.

What is claimed is:

1. A display panel, comprising:

data lines;

pixel circuits, wherein each pixel circuit of the pixel circuits comprises a driving transistor and a data writing module; the data writing module comprises a first end electrically connected to a data line of the data lines, and a second end electrically connected to the driving transistor; each pixel circuit of the pixel circuits has a work cycle comprising a data writing stage and at least one adjustment stage; wherein the data writing module in the pixel circuit is turned on in the data writing stage to write a data voltage in the data line into the driving transistor; and the data writing module in the pixel circuit is turned on in the adjustment stage to write an adjustment voltage in the data line into the driving transistor; and adjustment circuits, wherein at least one adjustment circuit of the adjustment circuits is electrically connected to a same data line, and an adjustment circuit of the adjustment circuits comprises a first capacitor, wherein for pixel circuits that are electrically connected to a target data line, in response to the data writing stage of a first pixel circuit, m pixel circuits are in the adjustment stage; in response to the data writing stage of a second pixel circuit, n pixel circuits are in the adjustment stage, where m>n; the target data line is one of the data lines; and both the first pixel circuit and the second pixel circuit are electrically connected to the target data line; and the first capacitor in at least one of the adjustment circuits is electrically connected to the target data line in response to the data writing stage of the second pixel circuit;

wherein the adjustment circuit further comprises a control module comprising a first end electrically connected to the data line of the data lines, and a second end electrically connected to a first electrode plate of the first capacitor; and the control module is configured to electrically connect the first capacitor to the data line when the control module is turned on, and electrically disconnect the first capacitor from the data line when the control module is turned off;

wherein the display panel further comprises: first scanning lines, wherein the first scanning lines comprise a first scanning sub-line and a second scanning sub-line, the first scanning sub-line is electrically connected to a control terminal of the data writing module, and the second scanning sub-line is electrically connected to a control terminal of the control module; and a shift register circuit comprising shift registers that are cascaded, wherein the first scanning lines are respectively electrically connected to output terminals of the shift registers;

in one work cycle of the pixel circuit, at least one adjustment stage is before the data writing stage and another at least one adjustment stage is after the data writing stage; and corresponding shift register electrically connected to at least one second scanning sub-line is cascaded before corresponding shift register electrically connected to the first scanning sub-line, and corresponding shift register electrically connected to another at least one second scanning sub-line is cascaded behind corresponding shift register electrically connected to the first scanning sub-line.

2. The display panel according to claim 1, further comprising a multiplexer circuit; wherein the multiplexer circuit comprises selector switches; and in the multiplexer circuit, the selector switches comprise input terminals electrically connected to each other, and output terminals respectively electrically connected to the data lines, and the selector switches are turned on in a time-sharing manner.

3. The display panel according to claim 1, comprising light-emitting devices; wherein an output terminal of the pixel circuit is electrically connected to the light-emitting device; and the adjustment circuit is electrically insulated from the light-emitting device.

4. The display panel according to claim 1, wherein
in one work cycle of the pixel circuit, the adjustment stage is before the data writing stage; and
one shift register of the shift registers electrically connected to the second scanning sub-line is cascaded behind one shift register of the shift registers electrically connected to the first scanning sub-line.

5. The display panel according to claim 1, wherein
in one work cycle of the pixel circuit, the adjustment stage is after the data writing stage; and
one shift register of the shift registers electrically connected to the first scanning sub-line is cascaded behind one shift register of the shift registers electrically connected to the second scanning sub-line.

6. The display panel according to claim 1, further comprising a control line and a pin; wherein the control line is electrically connected to a control terminal of the control module; and one end of the control line is electrically connected to the pin.

7. The display panel according to claim 1, wherein
one work cycle of the pixel circuit comprises the data writing stage and k adjustment stages; and
the data line is electrically connected to (2*k−x) adjustment circuits, wherein 2*k>x≥0.

8. The display panel according to claim 7, wherein x=1 or x=0.

9. The display panel according to claim 7, wherein x=2*k−1.

10. The display panel according to claim 1, wherein the data line is electrically connected to a plurality of adjustment circuits;
in the pixel circuits electrically connected to the target data line, in response to the data writing stage of a third pixel circuit, p pixel circuits are in the adjustment stage, wherein n>p; and the third pixel circuit is a pixel circuit electrically connected to the target data line; and
in response to the data writing stage of the second pixel circuit, a number of the first capacitors electrically connected to the target data line is a; and in response to the data writing stage of the third pixel circuit, a number of the first capacitors electrically connected to the target data line is b, wherein a>b.

11. The display panel according to claim 10, wherein b=0.

12. The display panel according to claim 1, wherein
the pixel circuit further comprises a threshold writing module; a second electrode of the data writing module is electrically connected to a first electrode of the driving transistor; and the threshold writing module comprises a first end electrically connected to a second electrode of the driving transistor, and a second end electrically connected to a gate of the driving transistor; and
in one work cycle of the pixel circuit, at least one adjustment stage is before the data writing stage, and the threshold writing module is turned on both in the data writing stage and in the adjustment stage that is before the data writing stage.

13. The display panel according to claim 1, wherein
in one work cycle of the pixel circuit, at least one adjustment stage is after the data writing stage; and
one work cycle of the pixel circuit further comprises light-emitting stages; and at least one adjustment stage that is after the data writing stage is set between adjacent light-emitting stages.

14. A display apparatus, comprising a display panel, wherein the display panel comprises:
data lines;
pixel circuits, wherein each pixel circuit of the pixel circuits comprises a driving transistor and a data writing module; the data writing module comprises a first end electrically connected to a data line of the data lines, and a second end electrically connected to the driving transistor; each pixel circuit of the pixel circuits has a work cycle comprising a data writing stage and at least one adjustment stage; wherein the data writing module in the pixel circuit is turned on in the data writing stage and writes a data voltage in the data line into the driving transistor; and the data writing module in the pixel circuit is turned on in the adjustment stage and writes an adjustment voltage in the data line into the driving transistor; and
adjustment circuits, wherein at least one adjustment circuit of the adjustment circuits is electrically connected to a same data line, and each adjustment circuit of the adjustment circuit comprises a first capacitor,
wherein for pixel circuits electrically connected to a target data line, in response to the data writing stage of a first pixel circuit, m pixel circuits are in the adjustment stage; in response to the data writing stage of a second pixel circuit, n pixel circuits are in the adjustment stage, where m>n; the target data line is one of the data lines; and both the first pixel circuit and the second pixel circuit are electrically connected to the target data line; and
a first capacitor in at least one of the adjustment circuits is electrically connected to the target data line in response to the data writing stage of the second pixel circuit;
wherein the adjustment circuit further comprises a control module comprising a first end electrically connected to the data line of the data lines, and a second end electrically connected to a first electrode plate of the first capacitor; and the control module is configured to electrically connect the first capacitor to the data line when the control module is turned on, and electrically disconnect the first capacitor from the data line when the control module is turned off;
wherein the display panel further comprises: first scanning lines, wherein the first scanning lines comprise a first scanning sub-line and a second scanning sub-line, the first scanning sub-line is electrically connected to a control terminal of the data writing module, and the second scanning sub-line is electrically connected to a control terminal of the control module; and a shift register circuit comprising shift registers that are cascaded, wherein the first scanning lines are respectively electrically connected to output terminals of the shift registers;
in one work cycle of the pixel circuit, at least one adjustment stage is before the data writing stage and another at least one adjustment stage is after the data writing stage; and
corresponding shift register electrically connected to at least one second scanning sub-line is cascaded before corresponding shift register electrically connected to the first scanning sub-line, and corresponding shift register electrically connected to another at least one second scanning sub-line is cascaded behind corresponding shift register electrically connected to the first scanning sub-line.

15. A display panel, comprising:
data lines;
pixel circuits, wherein each pixel circuit of the pixel circuits comprises a driving transistor and a data writing module; the data writing module comprises a first end electrically connected to a data line of the data lines, and a second end electrically connected to the driving transistor; each pixel circuit of the pixel circuits has a work cycle comprising a data writing stage and at least one adjustment stage; wherein the data writing module in the pixel circuit is turned on in the data writing stage to write a data voltage in the data line into the driving transistor; and the data writing module in the pixel circuit is turned on in the adjustment stage to write an adjustment voltage in the data line into the driving transistor; and adjustment circuits, wherein at least one adjustment circuit of the adjustment circuits is electrically connected to a same data line, and an adjustment circuit of the adjustment circuits comprises a first capacitor, wherein for pixel circuits that are electrically connected to a target data line, in response to the data writing stage of a first pixel circuit, m pixel circuits are in the adjustment stage; in response to the data writing stage of a second pixel circuit, n pixel circuits are in the adjustment stage, where m>n; the target data line is one of the data lines; and both the first pixel circuit and the second pixel circuit are electrically connected to the target data line; and the first capacitor in at least one of the adjustment circuits is electrically connected to the target data line in response to the data writing stage of the second pixel circuit;

wherein the adjustment circuit further comprises a control module comprising a first end electrically connected to the data line of the data lines, and a second end electrically connected to a first electrode plate of the first capacitor; and the control module is configured to electrically connect the first capacitor to the data line when the control module is turned on, and electrically disconnect the first capacitor from the data line when the control module is turned off;

wherein the control module comprises a first switch and a diode; the first switch comprises a first end electrically connected to the data line, and a second end electrically connected to an anode of the diode; and a cathode of the diode is electrically connected to the first electrode plate of the first capacitor.

16. A display panel, comprising:

data lines;

pixel circuits, wherein each pixel circuit of the pixel circuits comprises a driving transistor and a data writing module; the data writing module comprises a first end electrically connected to a data line of the data lines, and a second end electrically connected to the driving transistor; each pixel circuit of the pixel circuits has a work cycle comprising a data writing stage and at least one adjustment stage; wherein the data writing module in the pixel circuit is turned on in the data writing stage to write a data voltage in the data line into the driving transistor; and the data writing module in the pixel circuit is turned on in the adjustment stage to write an adjustment voltage in the data line into the driving transistor; and adjustment circuits, wherein at least one adjustment circuit of the adjustment circuits is electrically connected to a same data line, and an adjustment circuit of the adjustment circuits comprises a first capacitor, wherein for pixel circuits that are electrically connected to a target data line, in response to the data writing stage of a first pixel circuit, m pixel circuits are in the adjustment stage; in response to the data writing stage of a second pixel circuit, n pixel circuits are in the adjustment stage, where m>n; the target data line is one of the data lines; and both the first pixel circuit and the second pixel circuit are electrically connected to the target data line; and the first capacitor in at least one of the adjustment circuits is electrically connected to the target data line in response to the data writing stage of the second pixel circuit;

wherein the adjustment circuit further comprises a control module comprising a first end electrically connected to the data line of the data lines, and a second end electrically connected to a first electrode plate of the first capacitor; and the control module is configured to electrically connect the first capacitor to the data line when the control module is turned on, and electrically disconnect the first capacitor from the data line when the control module is turned off;

wherein the control module comprises a first switch and a diode; the first switch comprises a first end electrically connected to the data line, and a second end electrically connected to an anode of the diode; and a cathode of the diode is electrically connected to the first electrode plate of the first capacitor, wherein the adjustment circuit further comprises an adjustment reset module comprising a first end electrically connected to a reset signal line, and a second end electrically connected to the first electrode plate of the first capacitor.

* * * * *